United States Patent
Chae

(10) Patent No.: US 12,500,758 B2
(45) Date of Patent: Dec. 16, 2025

(54) COMMUNICATION SYSTEM, COMMUNICATION METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 168 days.

(21) Appl. No.: 18/022,518

(22) PCT Filed: Feb. 28, 2022

(86) PCT No.: PCT/JP2022/008320
§ 371 (c)(1),
(2) Date: Feb. 22, 2023

(87) PCT Pub. No.: WO2023/162233
PCT Pub. Date: Aug. 31, 2023

(65) Prior Publication Data
US 2024/0291653 A1    Aug. 29, 2024

(51) Int. Cl.
*H04L 9/14* (2006.01)
*H04L 9/40* (2022.01)

(52) U.S. Cl.
CPC ............ *H04L 9/14* (2013.01); *H04L 63/0428* (2013.01); *H04L 63/08* (2013.01)

(58) Field of Classification Search
CPC ........................................................ H04L 9/14
See application file for complete search history.

(56) References Cited

U.S. PATENT DOCUMENTS

2002/0004784 A1* 1/2002 Forbes ................. G06Q 30/06
                                                             705/51
2006/0204003 A1  9/2006 Takata et al.
2007/0182982 A1  8/2007 Hayashida et al.
(Continued)

FOREIGN PATENT DOCUMENTS

JP   2006238273 A   9/2006
JP   2007156785 A   6/2007
(Continued)

OTHER PUBLICATIONS

International Search Report of May 24, 2022, International Patent Application for PCT/JP2022/008320, pp. 1-10.
(Continued)

*Primary Examiner* — William R Korzuch
*Assistant Examiner* — Aditya Sriram
(74) *Attorney, Agent, or Firm* — HEA Law PLLC

(57) ABSTRACT

A communication system, comprising: a first device; and a second device; wherein the communication system is configured to generate a plurality of pieces of information based on a request received from the first device, wherein the first device is configured to transform original data based on the plurality of pieces of information and transit transformed data obtained as a result of the transformation to the second device, and wherein the second device is configured to inversely transform the transformed data based on the plurality of pieces of information to acquire to original data.

20 Claims, 12 Drawing Sheets

(56) References Cited

U.S. PATENT DOCUMENTS

| | | | | |
|---|---|---|---|---|
| 2007/0262852 | A1* | 11/2007 | Yamamura | G06F 21/31 |
| | | | | 340/10.51 |
| 2008/0066184 | A1* | 3/2008 | Ben-Ami | H04L 9/3242 |
| | | | | 726/27 |
| 2008/0092216 | A1 | 4/2008 | Kawano et al. | |
| 2009/0007257 | A1 | 1/2009 | Hirata et al. | |
| 2009/0094461 | A1 | 4/2009 | Tamura | |
| 2010/0235629 | A1* | 9/2010 | Tuda | G06Q 20/341 |
| | | | | 713/159 |
| 2011/0314281 | A1* | 12/2011 | Fielder | H04L 9/0838 |
| | | | | 713/168 |
| 2012/0233684 | A1* | 9/2012 | Denis | H04W 12/069 |
| | | | | 726/9 |
| 2012/0311700 | A1 | 12/2012 | Tamura | |
| 2014/0095884 | A1 | 4/2014 | Kannavara et al. | |
| 2015/0371052 | A1* | 12/2015 | Lepeshenkov | H04L 9/0866 |
| | | | | 713/165 |
| 2017/0338950 | A1 | 11/2017 | Chen | |
| 2018/0309734 | A1* | 10/2018 | Yu | H04L 63/0428 |
| 2019/0052632 | A1 | 2/2019 | Takagi | |
| 2019/0297075 | A1* | 9/2019 | Kaladgi | G06F 21/34 |
| 2020/0202329 | A1* | 6/2020 | Yoo | G06F 21/606 |
| 2021/0191880 | A1* | 6/2021 | Ki | G06F 12/1408 |
| 2021/0192657 | A1* | 6/2021 | Nakashima | G06F 21/316 |
| 2021/0374219 | A1 | 12/2021 | Suwa et al. | |

FOREIGN PATENT DOCUMENTS

| | | | |
|---|---|---|---|
| JP | 2007221747 | A | 8/2007 |
| JP | 2008097575 | A | 4/2008 |
| JP | 2009093342 | A | 4/2009 |
| JP | 2012027887 | A | 2/2012 |
| JP | 4966765 | B2 | 7/2012 |
| JP | 2012160799 | A | 8/2012 |
| JP | 2017531967 | A | 10/2017 |
| JP | 6866803 | B2 | 4/2021 |
| JP | WO2020085141 | A1 | 9/2021 |
| KR | 20040068499 | A * | 7/2004 |

OTHER PUBLICATIONS

PIDS: "5G report to be checked for LI", ETSI Draft; LI(17)R41001R1, European Telecommunications Standards Institute (ETSI), 650, Route Des Lucioles; F-06921 Sophia-Antipolis; France, vol. TC—LI—Lawful Interception Aug. 30, 2017, pp. 1-605, XP014298841, retrieved from the internet; URL: docbox.etsi.org\LI\LI\05-CONTRIBUTIONS\2017\LI(17)R41001r1_5G_report_to_be_checked_for_LI_\33899-130.docx [retrieved on Aug. 30, 2017].

Wang Xiyu et.al. "One-Factor Cancellable Palmprint Recognition Scheme Based on OIOM and Minimum Signature Hash", IEEE Access, vol. 7, Aug. 28, 2019, pp. 131338-131354, XP011747353, DOI: 10.1109/ACCESS.2019.2938019 [retrieved on Sep. 23, 2019].

Search Report of Sep. 5, 2023, for corresponding EP Patent Application No. 22857076.8, pp. 1-14.

Office Action of Sep. 3, 2024, for corresponding JP Patent Application No. 2023-166239 with English translation, pp. 1-8.

* cited by examiner

FIG.4

| FIRST SALT | SECOND SALT |
|---|---|
| 6437 | 8414 |
| 3101 | 2981 |
| ... | ... |
| 8201 | 1983 |

| USER ID | PASSWORD | FULL NAME | TUID | PHOTOGRAPH OF FACE | FEATURE AMOUNT OF FACE |
|---|---|---|---|---|---|
| taro.yamada123 | ********** | TARO YAMADA | 312456 | 00001.jpg | (a1,b2,c3,·····) |
| hanako.suzuki999 | ******* | HANAKO SUZUKI | 409193 | 00002.jpg | (a2,b2,c2,·····) |
| jiro.kimura1010 | ******** | JIRO KIMURA | 225091 | 00003.jpg | (a3,b3,c3,·····) |
| ... | ... | ... | ... | ... | ... |

COMMUNICATION SYSTEM, COMMUNICATION METHOD, AND PROGRAM

CROSS REFERENCE TO RELATED APPLICATIONS

This application is a National Stage of International Application No. PCT/JP2022/008320 filed on Feb. 28, 2022. The contents of the above document is incorporated herein by reference in its entirety.

TECHNICAL FIELD

The present disclosure relates to a communication system, a communication method, and a program.

BACKGROUND ART

Hitherto, in the field of communication, there has been known a technology for transforming original data so as to prevent content of the original data from being known to a third party. For example, in Patent Literature 1, there is described a technology for generating a user parameter based on a user ID input by a user and transforming biometric data, which is an example of the original data, based on the generated user parameter. For example, in Patent Literature 2, there is described a technology for transforming a salt, which is an example of the original data, through use of a public key cryptosystem. For example, in Patent Literature 3, there is described a technology called "challenge-and-response," which is a kind of public key cryptosystem.

CITATION LIST

Patent Literature

[PTL 1] JP 4966765 B2
[PTL 2] JP 6866803 B2
[PTL 3] JP WO 2020/85141 A1

SUMMARY OF INVENTION

Technical Problem

However, in the technology of Patent Literature 1, a user parameter is transmitted over a network, and hence a malicious third party can easily acquire the user parameter. When the third party obtains biometric data on a user in some way, impersonation using the fraudulently obtained user parameter and biometric data becomes possible. A user parameter is generated based on a user ID that does not change in principle once issued, and hence it becomes possible for the third party to impersonate the user over a long period of time through use of the user parameter obtained once.

The public key cryptosystems of Patent Literatures 2 and 3 are each a cryptosystem using a pair of a public key, which is disclosed to third parties, and a secret key, which is not disclosed to third parties. However, a secret key is information that does not change in principle, and hence when a third party obtains the secret key in some way, it becomes possible for the third party to keep committing a fraud over a long period of time through use of the secret key obtained once. The technologies of Patent Literatures 1 to 3 each adversely allow a fraud over a long period of time, and hence security in communication cannot be sufficiently enhanced.

One of objects of the present disclosure is to enhance security in communication.

Solution to Problem

According to one aspect of the present disclosure, there is provided a communication system including: a first device; a second device; and a generation module configured to generate a plurality of pieces of information based on a request received from the first device, wherein the first device is configured to transform original data based on the plurality of pieces of information and transmit transformed data obtained as a result of the transformation to the second device, and wherein the second device is configured to inversely transform the transformed data based on the plurality of pieces of information to acquire the original data.

Advantageous Effects of Invention

According to the present disclosure, the security in the communication is enhanced.

BRIEF DESCRIPTION OF DRAWINGS

FIG. 4 is a table for showing an example of a salt database.

FIG. 5 is a table for showing an example of a user database.

DESCRIPTION OF EMBODIMENTS

1. First Embodiment

A communication system according to a first embodiment of the present disclosure, which is an exemplary embodiment of the present disclosure, is described. In the first embodiment, a case in which the communication system is applied to a situation in which user authentication is performed is taken as an example, but the communication system can be applied to any situation. Examples of application to another situation is described in Modification Example 5 described later.

1-1. Overall Configuration of Communication System

Figure 1:
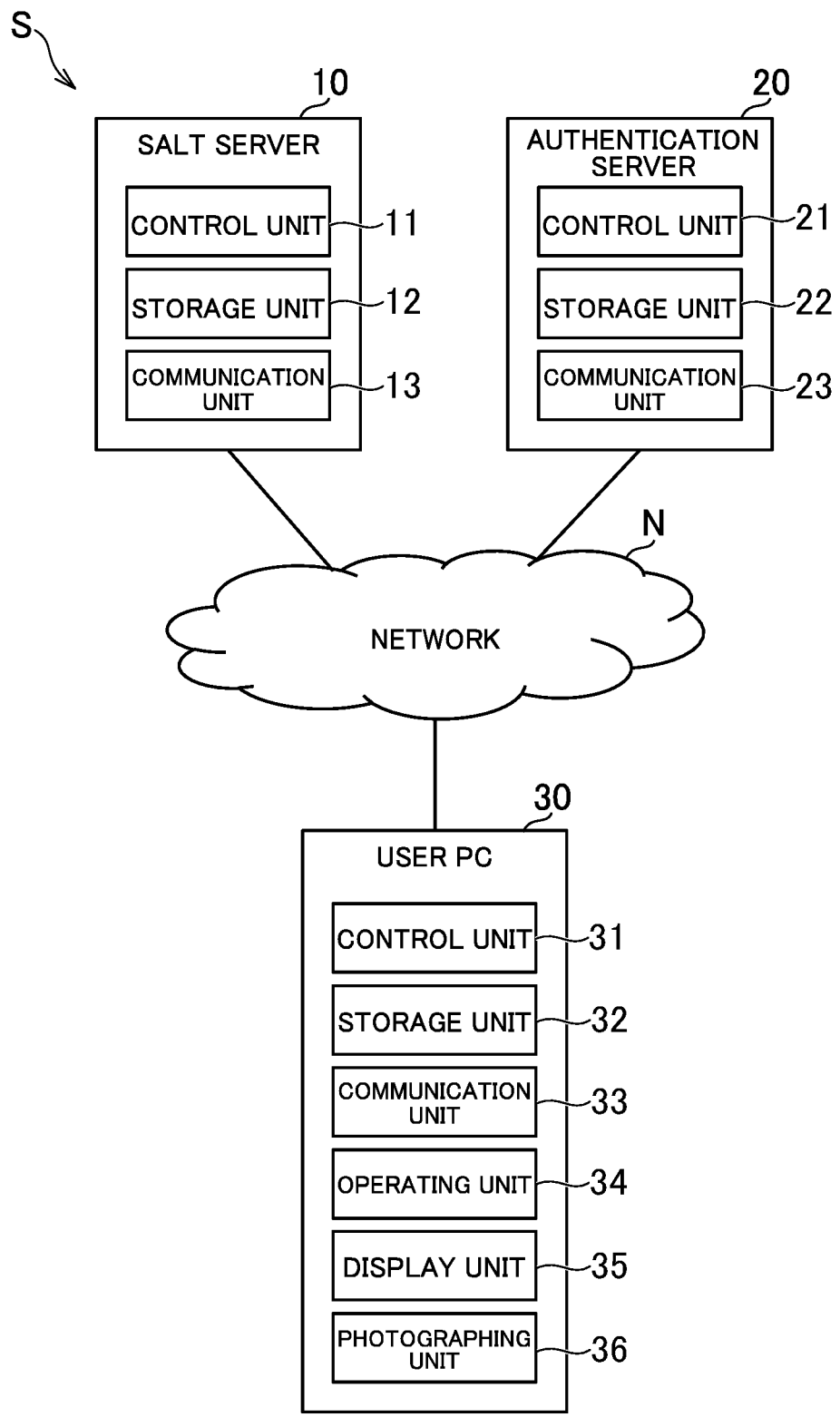
FIG. 1 is a diagram for illustrating an example of an overall configuration of a communication system.

FIG. 1 is a diagram for illustrating an example of an overall configuration of the communication system. As illustrated in FIG. 1, a communication system S includes a salt server 10, an authentication server 20, and a user PC 30. The salt server 10, the authentication server 20, and the user PC 30 can be connected to a network N such as the Internet or a LAN. The communication system S is only required to include at least one computer, and is not limited to the example of FIG. 1.

The salt server 10 is a server computer. A control unit 11 includes at least one processor. A storage unit 12 includes a volatile memory such as a RAM, and a nonvolatile memory such as a hard disk drive. A communication unit 13 includes at least one of a communication interface for wired communication or a communication interface for wireless communication.

The salt server 10 is an example of a management device. Accordingly, the salt server 10 as used herein can be read as "management device." The management device may be any device, and is not limited to the salt server 10 or another server computer. For example, the management device may be a personal computer, a tablet terminal, or a smartphone.

The salt server 10 manages salts in cryptography. A salt is information for transforming information to be transformed. The salt is the information to be input to a transform function together with the information to be transformed. The transformation may also be called "encryption" or "hashing." The transformation is reversible. Transformed information can be restored to information that has not been transformed by inverse transformation. Managing salts refers to storing salts.

As for the salt itself, a publicly known salt can be used. For example, the salt is a random value. The salt can have any format, such as numbers, characters, other symbols, or a combination thereof. The salt server 10 may generate a salt, or the salt generation itself may be performed by a device other than the salt server 10.

The authentication server 20 is a server computer. Physical configurations of a control unit 21, a storage unit 22, and a communication unit 23 may be the same as those of the control unit 11, the storage unit 12, and the communication unit 13, respectively.

The authentication server 20 is an example of a second device. Accordingly, the authentication server 20 as used herein can be read as "second device." The second device may be any device, and is not limited to the authentication server 20 or another server computer. For example, the second device may be a personal computer, a tablet terminal, or a smartphone.

The user PC 30 is a personal computer of a user. Physical configurations of a control unit 31, a storage unit 32, and a communication unit 33 may be the same as those of the control unit 11, the storage unit 12, and the communication unit 13, respectively. An operating unit 34 is an input device such as a mouse, a keyboard, or a touch panel. A display unit 35 is a liquid crystal display or an organic EL display. A photographing unit 36 includes at least one camera.

The user PC 30 is an example of a first device. Accordingly, the user PC 30 as used herein can be read as "first device." The first device may be any device, and is not limited to the user PC 30 or another personal computer. For example, the first device may be a tablet terminal, a smartphone, or a wearable terminal. In addition, for example, the first device may be a game machine, a vending machine, a POS terminal, an ATM, or another device.

Programs stored in the storage units 12, 22, and 32 may be supplied via the network N. For example, the programs stored in an information storage medium may be supplied through intermediation of at least one of a reading unit (for example, an optical disc drive or a memory card slot) for reading a computer-readable information storage medium, or an input/output unit (for example, a USB port) for inputting and outputting data to/from an external device.

1-2. Outline of Communication System According to First Embodiment

For example, in the communication system S, multi-factor authentication is executed in order to verify the validity of a user. The multi-factor authentication is authentication that combines a plurality of factors. In the first embodiment, two-factor authentication that combines two factors is taken as an example, but multi-factor authentication that combines three or more factors may be used. As the factor itself, it is possible to use any one of various types, examples of which include a biometric factor, a possession factor, and a knowledge factor.

In the multi-factor authentication, authentication data corresponding to the factor is used. As the authentication data itself, it is possible to use any one of various types. For example, in the biometric authentication, biometric data such as a photograph of a face, a feature amount of the face, a photograph of a fingerprint, a feature amount of a fingerprint, a scanned image of a vein, or a feature amount of a vein corresponds to the authentication data. In the possession authentication, possession information such as a one-time password, information recorded in an IC card, or information recorded in a token corresponds to the authentication data. In the knowledge authentication, knowledge information such as a user ID, a password, a PIN, or a secret question corresponds to the authentication data.

In the first embodiment, a case in which the multi-factor authentication is executed in order to log in to an online service is taken as an example, but the multi-factor authentication can be applied to any situation. For example, the multi-factor authentication can be applied to another situation such as a time of applying for an online service, a time of executing electronic payments, or a time of performing an administrative procedure online. Various services can be applied to the online service itself. For example, a financial service, a communication service, a payment service, an electronic commerce service, or a social networking service (SNS) may correspond to the online service.

For example, when a user registers use of an online service, a user ID and a password for login to the online service are issued. The user uses the user PC 30 to access a website of the online service and input the user ID and the password. The authentication server 20 verifies the validity of the user based on the user ID and the password that have been input by the user. Once the validity of the user is verified, the user can log in to the online service.

It requires considerable time and effort to request a user to input the user ID and the password for every login. Thus, it is conceivable to reduce the time and effort for inputting the user ID by multi-factor authentication that combines face authentication and password authentication. However, even in this case, it still requires time and effort to input the password. When a user is allowed to log in only by face authentication without requiring any input to the operating unit 34, there is a possibility that another user having a similar face may be erroneously authenticated. When the photographing unit 36 includes a 3D sensor, the face authentication can be executed with a certain degree of accuracy, but erroneous recognition may still occur. When the photographing unit 36 does not include a 3D sensor, the probability of erroneous recognition increases. There is another possibility that a third party who has somehow obtained the photograph of the face of a user may impersonate the user.

In view of this, in the first embodiment, in order to ensure security without receiving any input from the operating unit 34, the authentication server 20 issues a temporary user ID when a user logs in to an online service. This temporary user ID is hereinafter referred to as "TUID." The TUID is information that can identify a user. The TUID becomes invalid when a predetermined invalidation condition is satisfied. In the first embodiment, a case in which the login of the user to the online service corresponds to the invalidation condition is taken as an example, but the invalidation condition may be any condition. For example, the invalidation condition may be a condition that a predetermined expiration date has expired, that login has occurred a certain number of times, or that the user has performed a predetermined operation.

The TUID issued by the authentication server 20 is recorded in the user PC 30. In the first embodiment, a case in which the TUID is recorded as a cookie for a browser is described, but the TUID may be recorded as information other than the cookie. The TUID may be displayed on the display unit 35, but is assumed to be hidden from the user in principle. For the second and subsequent times of login, TUID authentication using the TUID is executed together with the face authentication. The TUID authentication is not successful unless the TUID authentication is executed from the user PC 30 on which the TUID is recorded, and hence the TUID authentication is a kind of possession authentication. The multi-factor authentication that combines the face authentication and the TUID authentication is considered to be able to ensure a certain degree of security without receiving any input from the operating unit 34.

However, reuse of the same TUID for a long period of time leads to a possibility that the valid TUID may be stolen by a malicious third party. For example, there is a possibility that a cookie may be stolen by a third party through a replay attack and a TUID included in the cookie may also be stolen. Assuming that a third party obtains not only a TUID but also the photograph of the face of a user in some way, impersonation becomes possible. Thus, it is also conceivable to invalidate the TUID after a certain period of time.

However, when the TUID becomes invalid immediately, a user who logs in infrequently is required to input the user ID and the password every time, thereby reducing convenience of the user. In view of this, in the first embodiment, a salt is used to transform a TUID in order to prevent the TUID from being stolen by a third party while enhancing the convenience of the user. However, when the reuse of the same salt for a long period of time leads to a possibility that the salt itself may be stolen by a malicious third party, and hence a plurality of salts are set to be generated each time the user logs in.

Figure 2:
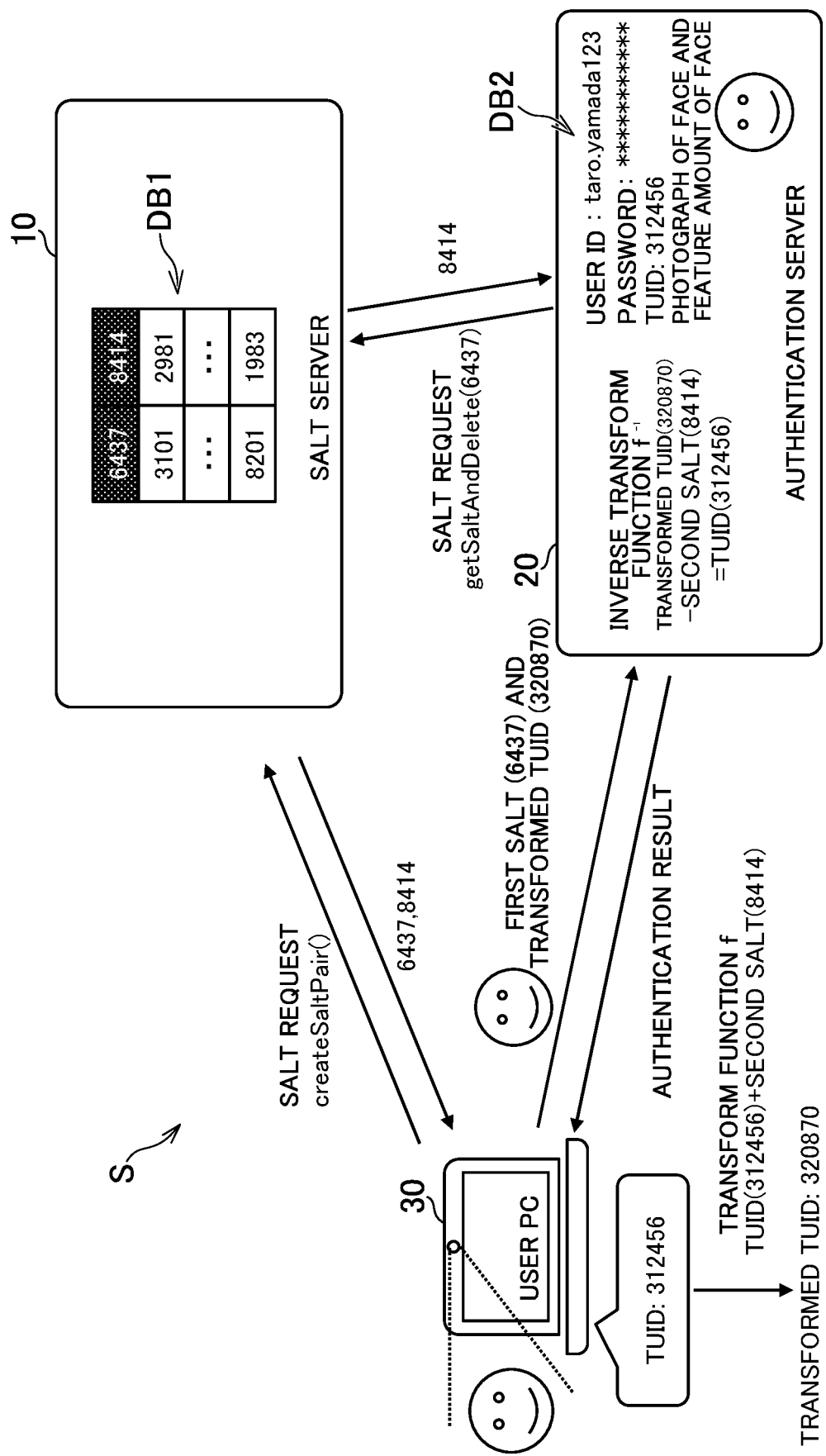
FIG. 2 is a diagram for illustrating an example of a flow of multi-factor authentication in a first embodiment of the present disclosure.

FIG. 2 is a diagram for illustrating an example of a flow of multi-factor authentication in the first embodiment. As illustrated in FIG. 2, when a user is to log in to an online service, the user PC 30 transmits a salt request for acquiring a salt to the salt server 10. In the example of FIG. 2, a command such as createSaltPair( ) is included in the salt request. This command does not include any salt-related condition, and hence even when a malicious third party steals a glance at the salt request, it is not possible to identify under which condition the salt has been generated.

When the salt server 10 receives the salt request, the salt server 10 generates a pair of salts, namely, a first salt "6437" and a second salt "8414", and stores the pair in a salt database DB1. Instead of dynamically generating a pair of salts immediately, the salt database DB1 may store a large number of salts in advance, and the salt server 10 may acquire a pair of salts from the salt database DB1. The first salt and the second salt may be automatically deleted after a certain period of time. The salt server 10 transmits the first salt "6437" and the second salt "8414" to the user PC 30.

When the user PC 30 receives the first salt "6435" and the second salt "8414" from the salt server 10, the user PC 30 transforms a TUID "312456" based on the second salt "8414" and a predetermined transform function "f". In the example of FIG. 2, the transform function "f" is a function that adds the second salt "8414" to the TUID "312456". A sum of those, that is, "320870" is obtained as a TUID that has been transformed. The user PC 30 transmits, to the authentication server 20, an authentication request including the photograph of the face of the user generated by the photographing unit 36, the first salt "6437", and the transformed TUID "320870".

When the authentication server 20 receives the authentication request, the authentication server 20 transmits a salt request including the first salt "6437" to the salt server 10. This salt request is different from the salt request transmitted by the user PC 30. This salt request includes a command such as getSaltAndDelete(6437). This command is a command to request acquisition of the second salt "8414" and deletion of the first salt "6437" and the second salt "8414".

When the salt server 10 receives the salt request, the salt server 10 refers to the salt database DB1 to acquire the second salt "8414" associated with the first salt "6437" included in the salt request, and transmits the second salt "8414" to the authentication server 20. The first salt "6437" is used as a query and index for searching for the second salt "8414". The salt server 10 deletes the first salt "6437" and the second salt "8414" from the salt database DB1.

When the authentication server 20 receives the second salt "8414" from the salt server 10, the authentication server 20 inversely transforms the transformed TUID "320870" received from the user PC based on this salt "8414" and an inverse transform function $f^{-1}$. In the example of FIG. 2, the inverse transform function $f^{-1}$ is a function that subtracts the second salt "8414" from the transformed TUID "320870". The authentication server 20 acquires the TUID "312456" by the inverse transformation.

When the authentication server 20 acquires the TUID "312456", the authentication server 20 confirms whether the TUID "312456" is present in a user database DB2. The user database DB2 stores authentication data serving as a correct answer in multi-factor authentication. Processing for confirming the presence or absence of the TUID "312456" corresponds to the TUID authentication. When the TUID "312456" is not stored in the user database DB2, an error occurs at that time point, thereby inhibiting the user from logging in.

When the authentication server 20 confirms that the TUID "312456" is present in the user database DB2, the authentication server 20 acquires the feature amount of the face stored in the user database DB2 in association with the TUID "312456". The authentication server 20 executes the face authentication based on the acquired feature amount of the face and the feature amount of the face calculated from the photograph of the face received from the user PC 30. When the face authentication is successful, the authentication server 20 transmits, to the user PC 30, an authentication result indicating that the multi-factor authentication is successful. When the user PC 30 receives this authentication result, the user PC 30 is brought into a state of having logged in to the online service.

Assuming that, after the user logs in, a malicious third party steals the transformed TUID "320870" and the photograph of the face of the user through cross-site scripting (XSS) attack or the like, there is a risk that it may be possible for a third party to impersonate the user. To address this problem, the authentication server 20 may issue a new TUID and store the new TUID in the user database DB2 when the user logs in. That is, the authentication server 20 may update the TUID each time the user logs in. Assuming that the new TUID is "417632", the authentication server 20 is only required to transmit an authentication result including the new TUID "417632" to the user PC 30. Thus, the TUID is changed each time the user logs in, and hence even when a third party performs such a cross-site scripting (XSS) attack as described above, authentication cannot be successful, thereby being able to prevent impersonation. The new TUID "417632" may be transformed through use of the second salt "8414" that has already been received from the salt server 10. In this case, it is assumed that the authentication server 20 stores a transform function for transforming the new TUID and the user PC 30 stores the inverse transform function $f^{-1}$ for inversely transforming the new TUID that has been transformed. In this inverse transformation as well, the second salt "8414" that has already been received from the salt server 10 may be used.

As described above, the communication system S according to the first embodiment transforms the TUID, and inversely transforms the transformed TUID, based on the first salt and the second salt. Thus, a TUID is not transmitted over the network N as it is, and hence a third party can no longer easily obtain the TUID. In addition, the first salt and the second salt are dynamically generated in response to the request received from the user PC 30. Thus, even when a third party acquires the first salt and the second salt in some way, the first salt and the second salt are likely to be invalid at that time point, thereby enhancing security in communication. Now, details of the communication system S according to the first embodiment are described.

Figure 3:
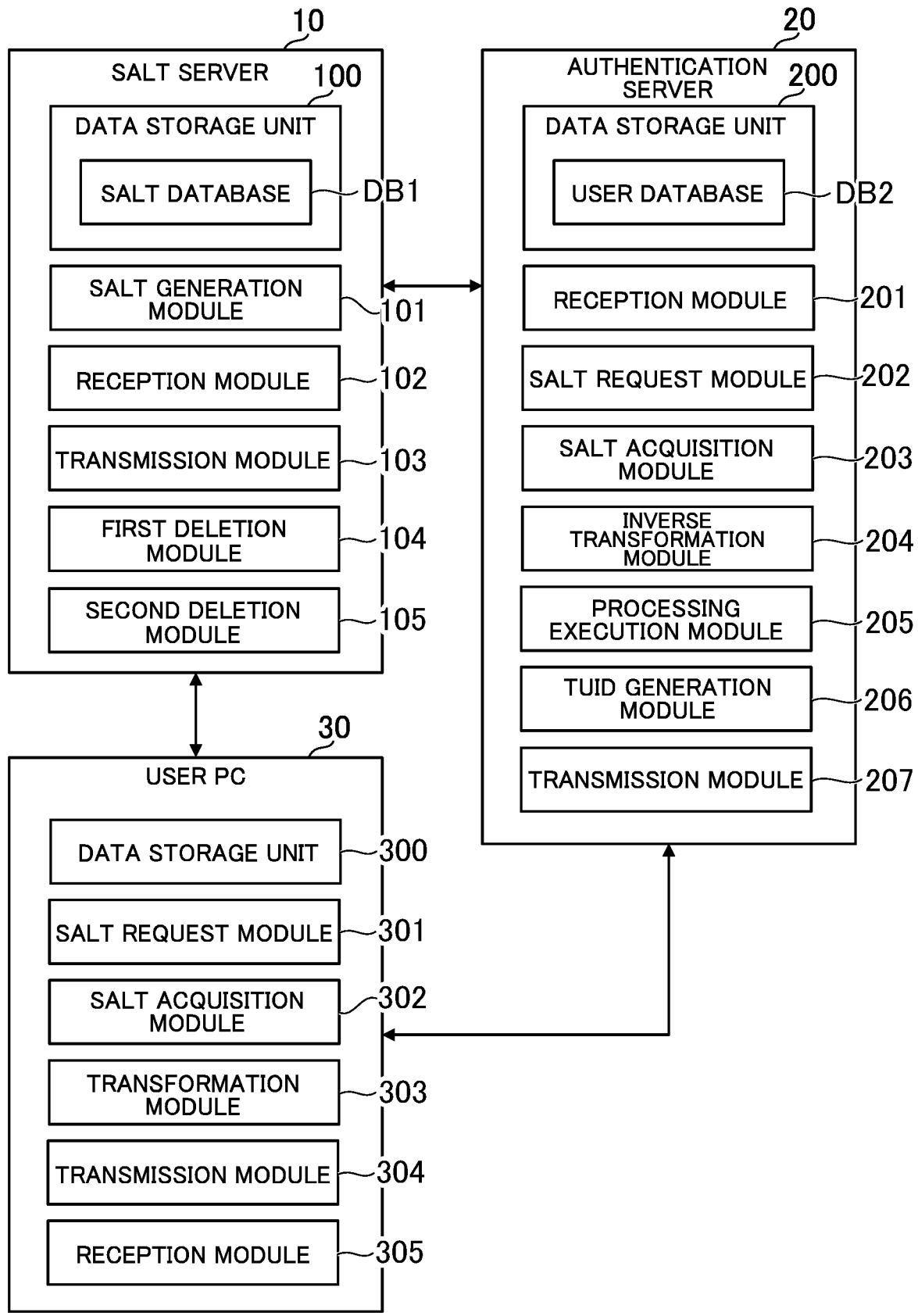
FIG. 3 is a functional block diagram for illustrating an example of functions implemented by a communication system according to the first embodiment.

1-3. Functions Implemented by Communication System According to First Embodiment FIG. 3 is a functional block diagram for illustrating an example of functions implemented by the communication system S according to the first embodiment.

1-3-1. Functions Implemented on Salt Server

A data storage unit 100 is implemented mainly by the storage unit 12. A salt generation module 101, a reception module 102, a transmission module 103, a first deletion module 104, and a second deletion module 105 are implemented mainly by the control unit 11.
[Data Storage Unit]

The data storage unit 100 stores data required for managing salts. For example, the data storage unit 100 stores the salt database DB1. When transformation information for transforming a TUID and inverse transformation information for inversely transforming the transformed TUID are information called by a name other than "salt," it suffices that the salt server 10 uses a database called by a name other than "salt database DB1" to manage the transformation information and the inverse transformation information.

FIG. 4 is a table for showing an example of the salt database DB1. The salt database DB1 is a database in which a plurality of salts are stored in association with each other. For example, the salt database DB1 stores pairs of the first salt and the second salt. The first salt and the second salt are hereinafter referred to simply as "salt" unless distinguished. When three or more salts are generated by the salt generation module 101, the three or more salts are associated with each other and stored in the salt database DB1.

A plurality of salts associated with each other in the salt database DB1 are an example of a plurality of pieces of information generated by the salt generation module 101. In addition, the first salt is an example of a first piece of information, and the second salt is an example of a second piece of information. Accordingly, the plurality of salts associated with each other as used herein can be read as "plurality of pieces of information." The first salt as used herein can be read as "first piece of information." The second salt as used herein can be read as "second piece of information."

The salt is an example of transformation information and is also an example of inverse transformation information. The salt as used herein can be read as "transformation information." The salt as used herein can also be read as "inverse transformation information." The transformation information is an encryption key in cryptography. The inverse transformation information is a decryption key in cryptography. In the first embodiment, the transformation information and the inverse transformation information are the same, and hence the transformation information and the inverse transformation information each correspond to a common key in cryptography. The transformation information and the inverse transformation information may be called by a name other than "key." For example, a password used for file encryption may correspond to the transformation information and the inverse transformation information.

The transformation information and the inverse transformation information may be different from each other. For example, the transformation information may be a public key in cryptography, and the inverse transformation information may be a secret key in cryptography. In contrast, the transformation information may be a secret key in cryptography, and the inverse transformation information may be a public key in cryptography. When the transformation information and the inverse transformation information are different from each other, both the transformation information and the inverse transformation information are stored in the salt database DB1. Of both of those, the transformation information is transmitted to the user PC 30, and the inverse transformation information is transmitted to the authentication server 20.

Each individual piece of information generated by the salt generation module 101 is information to be used for communication performed in the communication system S. This information may be the transformation information itself, or may be the inverse transformation information itself. Further, this information may be information to be used for acquiring the transformation information, or may be information to be used for acquiring the inverse transformation information. This information may be information called by any name other than "salt." For example, this information may be a key in cryptography or a password set for a file. In addition, for example, this information may be called by another name such as "passcode" or "password."

In the first embodiment, a case in which the first piece of information corresponds to the identification information and the second piece of information corresponds to the transformation information and inverse transformation information is described, but the roles of the first piece of information and the second piece of information may be reversed. That is, the first piece of information may correspond to the transformation information and inverse transformation information, and the second piece of information may be the identification information. The identification information is information that can identify other information. The identification information can also be said to be information for searching for other information. The identification information is used as an index for searching for other information.

The salt generation module 101 may generate three or more pieces of information. Thus, when the number of pieces of information generated by the salt generation module 101 is set to "n" (where "n" represents an integer of 3 or more), "n" pieces of information from the first piece of information to the n-th piece of information may be present. For example, when the transformation information and the inverse transformation information are mutually different information, the salt generation module 101 may generate three pieces of information, namely, the first piece of information, the second piece of information, and a third piece of information. In this case, the first piece of information may correspond to the identification information, the second piece of information may correspond to the transformation information, and the third piece of information may correspond to the inverse transformation information. The roles of the first piece of information to the third piece of information may be interchanged among the identification information, the transformation information, and the inverse transformation information.

The data storage unit 100 can store any data other than that of the salt database DB1. For example, the data storage unit 100 may store an algorithm for generating a salt. The data storage unit 100 may store data relating to an API for exchanging a salt with the authentication server 20 and the user PC 30. In the first embodiment, salt requests having mutually different formats are received from the authentication server 20 and the user PC 30, and hence a case in which an API for the authentication server 20 and an API for the user PC 30 are different from each other is described. However, the salt requests to be received from the authentication server 20 and the user PC 30 may be unified into the same format, and an API common to the authentication server 20 and the user PC 30 may be used.

[Salt Generation Module]

The salt generation module 101 generates a plurality of salts based on a request received from the user PC 30. For example, the salt generation module 101 generates, as the plurality of salts, the first salt and the second salt for transformation and inverse transformation. The salt generation module 101 generates a plurality of salts based on a predetermined algorithm. For example, the salt generation module 101 generates a plurality of salts having values that are different from each other and random. As a method itself of generating a random value, it is possible to use any one of various publicly known methods. For example, a method using a time stamp at a time of the salt generation may be used, or a method using data other than the time stamp may be used.

The salt generation module 101 stores the plurality of salts which have been generated in the salt database DB1. In the first embodiment, the salt generation module 101 generates the first salt and the second salt. The salt generation module 101 stores the first salt and the second salt in the salt database DB1 in association with each other. The association with each other refers to enabling one to be retrieved based on the other. In the first embodiment, a case in which the same salt is used for the transformation of the TUID and the inverse transformation of the transformed TUID is taken as an example.

[Reception Module]

The reception module 102 receives a salt request from each of the authentication server 20 and the user PC 30. A salt request is information having a predetermined format to be transmitted to request a salt. In FIG. 2, the salt request including a command such as createSaltPair( ) or getSaltAndDelete(first salt) is illustrated as an example, but the salt request may be any information indicating that a salt has been requested, and the salt request is not limited to the example of FIG. 2.

In the first embodiment, a case in which the salt request received from the authentication server 20 and the salt request received from the user PC 30 have formats different from each other is described, but the formats of those may be the same. The salt request is an example of a request for transformation information and is also an example of a request for inverse transformation information. Accordingly, the salt request as used herein can be read as "request for the transformation information" or "request for the inverse transformation information." Those requests can be called by any name other than "salt request."

[Transmission Module]

The transmission module 103 transmits the second salt corresponding to the inverse transformation information to the authentication server 20. For example, the transmission module 103 transmits the second salt corresponding to the inverse transformation information based on the salt request received from the authentication server 20. The transmission module 103 transmits the first salt corresponding to the identification information and the second salt corresponding to the transformation information to the user PC 30. The transmission module 103 transmits the first salt and the second salt based on the salt request received from the user PC 30.

Only one transmission module 103 is illustrated in FIG. 3, but the transmission of a salt to the user PC 30 and the transmission of a salt to the authentication server 20 can be regarded as separate functions. Thus, the transmission module 103 can be regarded as including a first transmission module 103A that transmits a salt to the user PC 30 when a salt request is received from the user PC 30 and a second transmission module 103B that transmits a salt to the authentication server 20 when a salt request is received from the authentication server 20. When a procedure for transmitting a salt to the user PC 30 and a procedure for transmitting a salt to the authentication server 20 are different, the first transmission module 103A may transmit a salt to the user PC 30 in accordance with the procedure for transmitting a salt to the user PC 30. The second transmission module 103B may transmit a salt to the authentication server 20 in accordance with the procedure for transmitting a salt to the authentication server 20.

[First Deletion Module]

The first deletion module 104 deletes a plurality of salts when a predetermined deletion time point is reached after the plurality of salts are generated. The deletion time point is a time point at which the plurality of salts are to be deleted. The deletion time point is a time point later than a generation time point at which the salts are generated by a certain period of time. A length of the period from the generation time point to the deletion time point may be any length of, for example, one second or shorter, about one second to ten seconds, or longer. The deleted salts become invalid, and hence the deletion time point can also refer to a time point to invalidate the salts.

It is assumed that, although not shown in FIG. 4, the deletion time point for the first salt and second salt is stored in the salt database DB1. The first deletion module 104 acquires the current date/time through use of a real-time clock, a GPS signal, or the like, and determines whether or not the deletion time point has been reached. The first deletion module 104 deletes, from the salt database DB1, the first salt and second salt determined to have reached the deletion time point.

The salt database DB1 may store the generation time point for the first salt and second salt in place of the deletion time point for the first salt and second salt. In this case, the first deletion module 104 may calculate the deletion time point later than the generation time point by a certain period of time, and may determine whether or not the calculated deletion time point has been reached. In addition, the length of the period from the generation time point to the deletion time point may be set based on some condition such as the user, the time slot, or the like instead of being set to be common to all the first salts and the second salts.

[Second Deletion Module]

The second deletion module 105 deletes a plurality of salts based on a request received from the authentication server 20. For example, in a case in which the salt request has been received from the authentication server 20 and the second salt has been transmitted to the authentication server 20, the second deletion unit 105 deletes the first salt and second salt. In other words, even before the deletion time point for the first salt and second salt has been reached, in the case in which the second salt has been transmitted to the authentication server 20 and the first salt and second salt are no longer required, the second deletion module 105 deletes the first salt and second salt from the salt database DB1.

1-3-2. Functions Implemented on Authentication Server

The authentication server 20 inversely transforms the transformed TUID, which is an example of transformed data, based on the plurality of salts to acquire the TUID, which is an example of original data. In the first embodiment, the authentication server 20 inversely transforms the transformed TUID to acquire the TUID, and executes authentication processing relating to the user based on the acquire TUID. A data storage unit 200 is implemented mainly by the storage unit 22. A reception module 201, a salt request module 202, a salt acquisition module 203, an inverse transformation module 204, a processing execution module 205, a TUID generation module 206, and a transmission module 207 are implemented.

[Data Storage Unit]

The data storage unit 200 stores data required for communication to/from the user PC 30. In the first embodiment, multi-factor authentication is executed in the communication system S, and hence the data storage unit 200 stores data required for multi-factor authentication. For example, the data storage unit 200 stores the user database DB2.

FIG. 5 is a table for showing an example of the user database DB2. The user database DB2 is a database in which pieces of information on the user are stored. For example, the user database DB2 stores a user ID, a password, a full name, a TUID, the photograph of a face, and the feature amount of the face. The information stored in the user database DB2 may be of any type, and is not limited to the example of FIG. 5. For example, a session ID for maintaining a session with the user PC 30, a past login history of a user, or an online service usage history of the user may be stored in the user database DB2.

The photograph of a face is an example of biometric data (biometric information). The TUID is an example of the authentication data (authentication information) different from biometric data. Accordingly, the photograph of the face as used herein can be read as "biometric data." The TUID as used herein can be read as "authentication data different from biometric data." Any combination of the biometric data and the authentication data different from biometric data may be used. This combination is the combination of factors in multi-factor authentication.

The biometric data is data to be used in biometric authentication. As the biometric data itself, any one of various types of data may be used, and for example, the feature amount of a face may correspond to the biometric data. Information called "template" obtained by transforming the feature amount of the face may correspond to the biometric data. When biometric authentication other than the face authentication is used, biometric data corresponding to biometric authentication may be used. Examples of other biometric data are as described above. The authentication data different from biometric data is information to be used in multi-factor authentication together with biometric data. This authentication data is the possession information or the knowledge information. In a case of multi-factor authentication using three or more factors, there may be a plurality of pieces of authentication data different from biometric data.

The data storage unit 200 can store any data other than the user database DB2. For example, the data storage unit 200 may store the inverse transform function $f^{-1}$. For example, the data storage unit 200 may store an algorithm for generating a TUID.

[Reception Module]

The reception module 201 receives the first salt and the transformed TUID from the user PC 30. The transformed TUID is an example of the transformed data. Accordingly, the transformed TUID as used herein can be read as "transformed data." The transformed data is data obtained by subjecting the TUID, which is an example of original data, to the transformation. The original data is data to be transformed. The original data is data that has not been transformed. The original data corresponds to plaintext in cryptography. In the first embodiment, the original data is authentication data relating to the user of the user PC 30. The original data is data that has not been transformed, and is thus sometimes called "raw data."

In the first embodiment, the reception module 201 receives the transformed TUID and the photograph of a face from the user PC 30. Receiving the photograph of the face refers to receiving image data on an image in which a face has been photographed. The photograph of the face may be a still image, or may be an individual frame included in a moving image. In the first embodiment, a case in which the transformed TUID and the photograph of the face are included in the authentication request is taken as an example. Thus, the reception module 201 receives the transformed TUID and the photograph of the face by receiving the authentication request from the user PC 30. The authentication request is a request for executing multi-factor authentication. The authentication request may be issued by transmitting information having a predetermined format. The authentication request may also include other information. For example, the authentication request may include information that can identify the user PC 30, such as the IP address of the user PC 30.

[Salt Request Module]

The salt request module 202 requests the salt server 10 for the remaining salt based on some of the plurality of salts. Some salt is the salt received from the user PC 30 by the authentication server 20. The remaining salt is a salt that has not been received from the user PC 30 by the authentication server 20. For example, the salt request module 202 requests the salt server 10 for the second salt based on the first salt. The salt request module 202 requests the salt server 10 for the second salt by transmitting a salt request including the first salt to the salt server 10. This salt request is a request for the second salt associated with the first salt.

[Salt Acquisition Module]

The salt acquisition module 203 acquires the remaining salt based on some salt among the plurality of salts. Some salt is a salt to be used for acquiring the remaining salt. The remaining salt is a salt to be used as the inverse transformation information. For example, the salt acquisition module 203 acquires the second salt based on the first salt. The salt acquisition module 203 is an example of an inverse transformation information acquisition module. Accordingly, the salt acquisition module 203 as used herein can be read as "inverse transformation information acquisition module." The inverse transformation information acquisition module acquires inverse transformation information, for example, a salt. When the inverse transformation information is called by a name other than "salt," the inverse transformation information acquisition module may be called by a name corresponding to this name. For example, when the inverse transformation information is called "key" or "password," the inverse transformation information acquisition module acquires a key or a password.

In the first embodiment, the salt server 10 manages the first salt and the second salt, and hence the salt acquisition module 203 acquires the second salt associated with the first salt from the salt server 10. The first salt and the second salt may be managed by the authentication server 20 itself. In this case, the data storage unit 200 stores the salt database DB1. In addition, in this case, the salt generation module 101, the reception module 102, the transmission module 103, the first deletion module 104, and the second deletion module 105, which have been described as being implemented by the salt server 10, are implemented by the authentication server 20.

[Inverse Transformation Module]

The inverse transformation module 204 inversely transforms the transformed TUID, which is an example of the transformed data, based on the remaining salt acquired by the salt acquisition module 203 to acquire the TUID, which is an example of the original data and authentication data. For example, the inverse transformation module 204 inversely transforms the transformed TUID based on the second salt to acquire the TUID. The inverse transformation module 204 executes the inverse transformation corresponding to the transformation performed by the transformation module 303. The inverse transformation is decryption in cryptography. It is assumed that the inverse transform function $f^{-1}$ for the inverse transformation is stored in the data storage unit 200. The inverse transformation module 204 uses the inverse transform function $f^{-1}$ to inversely transform the transformed TUID based on the second salt, which is an example of the inverse transformation information. In the example of FIG. 2, the inverse transformation module 204 inversely transforms the transformed TUID by subtracting the second salt from the transformed TUID to acquire the TUID.

The inverse transformation itself can use various inverse transform functions $f^{-1}$, and is not limited to the subtraction indicated in FIG. 2. The inverse transformation may be performed by, for example, addition, multiplication, division, matrix transformation, another calculation, or a combination thereof. In the example of FIG. 2, for simplification of the description, it is assumed that the transform function "f" and the inverse transform function $f^{-1}$ are a simple addition and a simple subtraction, respectively, but may be complicated calculation formulae to some extent in an actual case. In addition, the inverse transformation is not limited to the decryption in cryptography, but may be decompression of a compressed file. When the decompression corresponds to the inverse transformation, compression corresponds to the transformation. The compression causes a file to be transformed in some way, and thus corresponds to the transformation in the first embodiment. The decompression is processing for restoring a compressed file to an original state thereof, and thus corresponds to the inverse transformation in the first embodiment.

[Processing Execution Module]

The processing execution module 205 executes the authentication processing relating to the user based on the authentication data acquired by the first inverse transformation. In the first embodiment, multi-factor authentication is described as an example of the authentication processing, but the authentication processing may be single-factor authentication. For example, only TUID authentication may be executed without use of face authentication. In addition, processing to be executed by the processing execution module 205 is not limited to the authentication processing as long as the processing execution module 205 executes processing corresponding to a situation in which the communication system S is applied. Processing to be performed when the communication system S is applied to other situations is described in modification examples described later. The processing execution module 205 is only required to execute predetermined processing based on the original data acquired by the inverse transformation module 204.

For example, the processing execution module 205 executes multi-factor authentication based on the TUID inversely transformed by the inverse transformation module 204 and the photograph of the face received by the reception module 201. As described above, as the multi-factor authentication itself, any one of various types can be used. In the first embodiment, the processing execution module 205 refers to the user database DB2 to acquire the feature amount of the face associated with the TUID inversely transformed by the inverse transformation module 204. This feature amount of the face is authentication data to be used as a correct answer in multi-factor authentication. Of the feature amounts of the faces stored in the user database DB2, only the feature amounts of the faces associated with the TUID inversely transformed by the inverse transformation module 204 are subjected to comparison. Other feature amounts of the faces are not subjected to comparison.

The processing execution module 205 calculates the feature amount of the face based on the photograph of the face received by the reception module 201. As a method itself of calculating the feature amount of the face, any one of various calculation methods can be used. For example, the feature amount of the face may be calculated by a calculation method using a contrast filter or principal component analysis. The feature amount of the face can be expressed in any format such as a multidimensional vector, an array, or a single numerical value. The face authentication may be of a type in which two photographs of the faces are input to a machine learning model to determine similarity or dissimilarity instead of a type in which the feature amounts of the faces are compared to each other.

The processing execution module 205 determines the similarity or dissimilarity between the feature amount of the face acquired from the user database DB2 and the feature amount of the face calculated from the photograph of the face received by the reception module 201. For example, when the feature amounts of the faces are expressed by multidimensional vectors, a distance between the feature amounts of the faces in a vector space being smaller than a threshold value corresponds to the feature amounts being similar to each other. The processing execution module 205 determines that the multi-factor authentication is successful when the feature amounts of the faces are similar to each other. The processing execution module 205 determines that the multi-factor authentication has failed when the feature amounts of the faces are not similar to each other.

[TUID Generation Module]

The TUID generation module 206 generates a TUID based on a predetermined algorithm. The TUID generation module 206 generates a TUID to be newly recorded for the user PC 30 when there is no TUID on the user PC 30. Under a state in which there is a TUID on the user PC 30, in place of this TUID, the TUID generation module 206 generates a TUID (updated TUID) to be written to the user PC 30.

For example, the TUID generation module 206 generates a TUID so that the TUID becomes a random value. As a method itself of generating a random value, any one of various publicly known methods can be used. For example, a method using a time stamp at the time of generating a TUID may be used, or a method using data other than the time stamp may be used. The TUID generation module 206 stores the generated TUID in the user database DB2.

The TUID generation module 206 may generate a TUID so as to avoid duplicating the TUID of another user. The TUID generation module 206 may generate a TUID so as to avoid duplicating the TUID of another user whose face is similar while permitting duplication with the TUID of another user whose face is not similar. The TUID generation module 206 may generate a TUID when the multi-factor authentication is successful. That is, the TUID generation module 206 may generate a TUID each time the user logs in to the online service. When the login is performed for the first time, the TUID generation module 206 generates a TUID when the authentication of the user ID and password is successful.

A timing at which a TUID is generated may be any timing, and is not limited to the example of the first embodiment. For example, instead of invalidating the TUID based on login performed only once, in order to validate the same TUID a predetermined number of times equal to or more than two times, the TUID generation module 206 may generate a TUID each time login occurs the predetermined number of times. For example, when the TUID is provided with an expiration date, the TUID generation module 206 may generate the TUID when the user logs in at a time nearing the expiration date.

[Transmission Module]

The transmission module 207 transmits an authentication result of the multi-factor authentication to the user PC 30. The authentication result is information having a predetermined format that indicates whether or not the multi-factor authentication is successful. For example, the authentication result indicates whether or not login has been permitted. In the first embodiment, a new TUID is generated at a timing of login, and hence the authentication result includes the new TUID.

When the multi-factor authentication is successful, execution of predetermined processing is permitted. In the first embodiment, login to an online service is described as an example of this processing, but this processing may be any processing that is permitted on condition that the multi-factor authentication is successful. This processing may be determined based on a situation in which the communication system S is applied. For example, when the communication system S is applied to a financial service, execution of a transfer may correspond to the predetermined processing. For example, when the communication system S is applied to a payment service, execution of payment may correspond to the predetermined processing. For example, when the communication system S is applied to an electronic commerce service, purchasing a product may correspond to the predetermined processing. The predetermined processing may be any other processing.

1-3-3. Functions Implemented on User PC

The user PC 30 transforms a TUID, which is an example of the original data, based on a plurality of salts, and transmits the transformed TUID, which is an example of the transformed data, to the authentication server 20. A data storage unit 300 is implemented mainly by the storage unit 32. A salt request module 301, a salt acquisition module 302, a transformation module 303, a transmission module 304, and a reception module 305 are implemented mainly by the control unit 31.

[Data Storage Unit]

The data storage unit 300 stores data required for multi-factor authentication. For example, the data storage unit 300 stores a TUID and a transform function "f". When the photographing unit 36 is not used for generating the photograph of the face of the user, the data storage unit 300 may store the image data on the photograph of the face of the user. For example, when an application for an online service is provided, the data storage unit 300 may store this application.

[Salt Request Module]

The salt request module 301 requests the salt server 10 for a plurality of salts. For example, the salt request module 301 requests the salt server 10 for the first salt and the second salt. The salt request module 301 transmits a salt request to the salt server 10 to request a salt therefrom. In the first embodiment, the salt request module 301 transmits, to the salt server 10, a salt request that does not include information relating to an acquisition rule for the first salt and the second salt. For example, when the first salt and second salt generated based on a time stamp are acquired, the acquisition rule is the time stamp. The salt request does not include information on the time stamp, and thus does not include the information relating to the acquisition rule.

The salt request may include the acquisition rule for the first salt and the second salt. For example, information to be a seed for generating the first salt and the second salt may be included in the salt request.

In the first embodiment, the salt request module 301 transmits a salt request to the salt server 10 when the photographing unit 36 generates a photograph of the face. The salt request module 301 may transmit a salt request at any timing, which is not limited to the timing at which the photograph of the face is generated. For example, the salt request module 301 may transmit a salt request at a timing at which the application for the online service is activated, at a timing at which the user performs an operation for login, or at a timing at which the website of the online service is accessed.

[Salt Acquisition Module]

The salt acquisition module 302 acquires a plurality of salts. For example, the salt acquisition module 302 acquires the first salt and the second salt. The salt acquisition module 302 acquires the first salt and the second salt associated with each other in the salt database DB1. The salt acquisition module 302 is an example of a transformation information acquisition module. Accordingly, the salt acquisition module 302 as used herein can be read as "transformation information acquisition module." The transformation information acquisition module acquires transformation information, for example, a salt. When the transformation information is called by a name other than "salt," the transformation information acquisition module may be called by a name corresponding to this name. For example, when the transformation information is called "key" or "password," the transformation information acquisition module acquires a key or a password.

[Transformation Module]

The transformation module 303 transforms a TUID, which is an example of the original data and authentication data, based on some of the plurality of salts. For example, the transformation module 303 transforms a TUID based on the second salt to generate a transformed TUID. The transformation is encryption in cryptography. It suffices that the transformation involves changing the TUID in some way. For example, inputting the TUID into some function, changing a part of the TUID, changing the entire TUID, adding some information to the TUID, or deleting a part of the TUID corresponds to the transformation. The inverse transformation may be any processing in a reverse direction thereto (processing for restoring the original TUID). As described above, the compression of a file may correspond to the transformation, and the decompression of a file may correspond to the inverse transformation. In this case, the second salt is used as a password to execute compression or decompression.

The transform function "f" for the transformation is assumed to be stored in the data storage unit 300. The transformation module 303 uses the transform function "f" to transform the TUID that has not been transformed based on the salt, which is an example of the transformation information. In the example of FIG. 2, the transformation module 303 transforms the TUID that has not been transformed by adding the second salt to the TUID that has not been transformed, to thereby acquire the transformed TUID. The transformation itself can use any one of various transform functions, and is not limited to the addition indicated in FIG. 2. The transformations may be performed by, for example, subtraction, multiplication, division, matrix transformation, another calculation, or a combination thereof.

[Transmission Module]

The transmission module 304 transmits some of the plurality of salts and the transformed TUID to the authentication server 20. The transmission module 304 transmits the first salt and the transformed TUID to the authentication server 20. For example, the transmission module 304 transmits the first salt, the transformed TUID, and the photograph of the face to the authentication server 20. In the first embodiment, a case in which the first salt, the transformed TUID, and the photograph of the face are included in the authentication request is taken as an example. Thus, a case in which the transmission module 304 transmits the authentication request including the first salt, the transformed TUID, and the photograph of the face to the authentication server 20 is described, but the transmission module 304 is not required to transmit the first salt, the transformed TUID, and the photograph of the face collectively in one piece of data. The transmission module 304 may separately transmit the first salt, the transformed TUID, and the photograph of the face. Instead of being transmitted as it is, the photograph of the face may also be transformed based on a salt or another encryption key. The feature amount of the face may be calculated on the user PC 30 side, and the calculated feature amount of the face may be transmitted as the biometric data.

[Reception Module]

The reception module 305 receives the authentication result from the authentication server 20. When this authentication result indicates success, the user logs in to the online service. That is, the execution of the predetermined processing described above is permitted. When a new TUID is included in the authentication result, the reception module 305 records the TUID included in the authentication result in the data storage unit 300. The old TUID recorded so far is discarded from the data storage unit 300.

Figure 6:
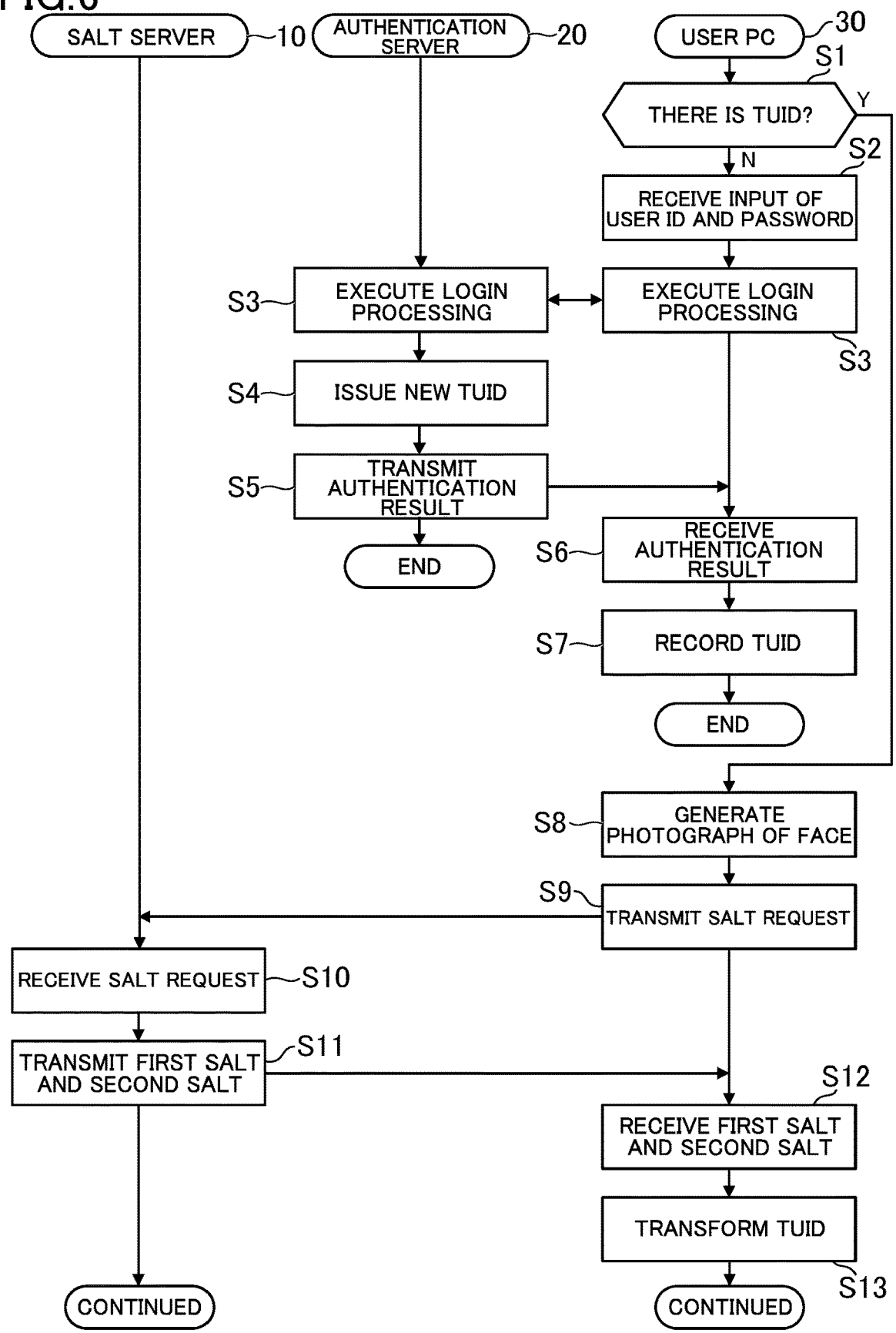
FIG. 6 is a diagram for illustrating an example of processing to be executed by the communication system according to the first embodiment.
Figure 7:
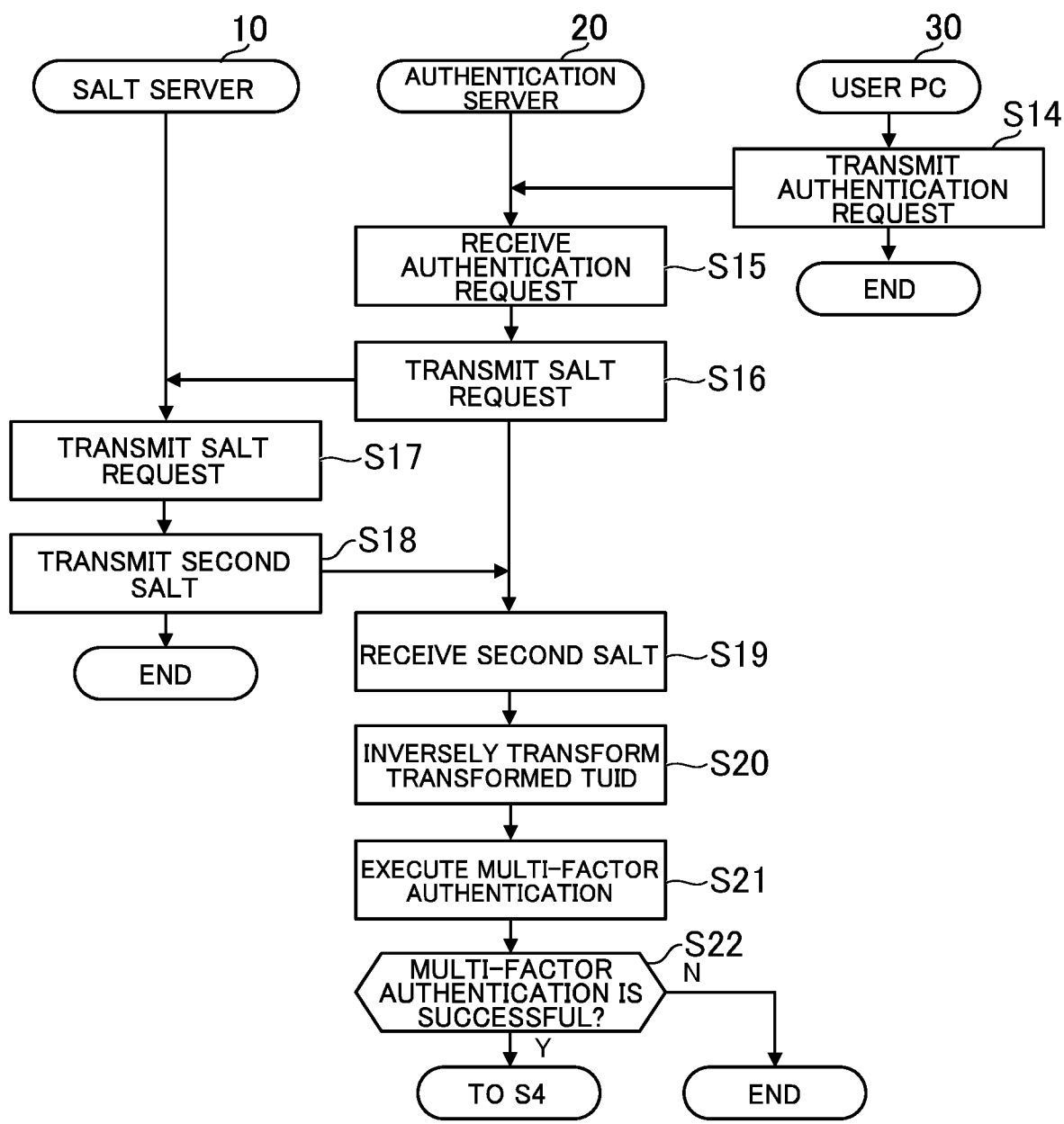
FIG. 7 is a diagram for illustrating an example of the processing to be executed by the communication system according to the first embodiment.

1-4. Processing to be Executed by Communication System According to First Embodiment FIG. 6 and FIG. 7 are diagrams for illustrating an example of processing to be executed by the communication system S according to the first embodiment. The control units 11, 21, and 31 execute programs stored in the storage units 12, 22, and 32, respectively, to thereby execute the processing of FIG. 6 and FIG. 7. It is assumed that the user ID and password of the user have already been issued for the execution of the processing of FIG. 6 and FIG. 7.

As illustrated in FIG. 6, the user PC 30 activates an application of an online service, and determines whether or not there is a TUID in the storage unit 32 (Step S1). When it is determined that there is no TUID (N in Step S1), the user PC 30 receives the input of a user ID and password by the user based on a detection signal obtained by the operating unit 34 (Step S2). Login processing for logging in to the online service is executed between the authentication server 20 and the user PC 30 (Step S3). In Step S3, the validity of the user ID and password is verified based on the user database DB2. When the login is successful, the authentication server 20 issues a new TUID (Step S4), and transmits an authentication result including the new TUID to the user PC 30 (Step S5).

When the user PC 30 receives the authentication result (Step S6), the user PC 30 records the TUID included in the authentication result in the storage unit 32 (Step S7), and this processing ends. In Step S7, the TUID may be recorded as a part of a cookie. After that, the user PC 30 executes processing for allowing the user to use the online service. When the user performs an operation for logging out of the online service, logout processing for logging out of the online service is executed between the authentication server 20 and the user PC 30.

When it is determined in Step S1 that there is a TUID (Y in Step S1), the user PC 30 photographs the face of the user based on the photographing unit 36 to generate a photograph of the face (Step S8). The user PC 30 transmits a salt request to the salt server 10 (Step S9). When the salt server 10 receives the salt request (Step S10), the salt server 10 generates the first salt and the second salt, stores the first salt and the second salt in the salt database DB1, and transmits the first salt and the second salt to the user PC 30 (Step S11). When the user PC 30 receives the first salt and the second salt from the salt server 10 (Step S12), the user PC 30 transforms the TUID stored in the storage unit 32 based on the second salt (Step S13).

Referring now to FIG. 7, the user PC 30 transmits, to the authentication server 20, an authentication request including the first salt received in Step S12, the transformed TUID obtained in Step S13, and the photograph of the face generated in Step S8 (Step S14). When the authentication server 20 receives the authentication request (Step S15), the authentication server 20 transmits a salt request including the first salt to the salt server 10 (Step S16). When the salt server 10 receives the salt request (Step S17), the salt server 10 transmits, to the authentication server 20, the second salt associated with the first salt based on the salt database DB1 (Step S18).

When the authentication server 20 receives the second salt from the salt server 10 (Step S19), the authentication server 20 inversely transforms the transformed TUID included in the authentication request received in Step S15 based on this second salt (Step S20). The authentication server 20 executes multi-factor authentication based on the TUID inversely transformed in Step S20 and the photograph of the face included in the authentication request received in Step S15 (Step S21). In Step S21, the authentication server 20 acquires the feature amount of the face associated with the TUID inversely transformed in Step S20 based on the user database DB2. The authentication server 20 calculates the feature amount of the face based on the photograph of the face received in Step S15. The authentication server 20 determines whether or not a degree of similarity between the acquired feature amounts of the faces is equal to or larger than a threshold value. When the TUID is present in the user database DB2 and the degree of similarity between the feature amounts of the faces is equal to or larger than the threshold value, the multi-factor authentication is successful.

The authentication server 20 determines whether or not the multi-factor authentication is successful (Step S22). When the multi-factor authentication fails (N in Step S22), this processing ends. In this case, the input of the user ID and password may be requested. When the multi-factor authentication is successful (Y in Step S22), the user is permitted to log in to the online service, and the process advances to the processing step of Step S4. The TUID of the user PC 30 is updated in the processing step of Step S4 and the subsequent steps.

According to the communication system S of the first embodiment, the user PC 30 transforms a TUID based on a plurality of salts and transmits the transformed TUID to the authentication server 20. The authentication server 20 acquires the TUID by inversely transforming the transformed TUID based on the plurality of salts. Thus, the transformed TUID is transmitted over a network, and it becomes difficult for a third party to acquire the TUID, thereby enhancing security in communication. Even when a malicious third party steals a salt request destined for the salt server 10 from the authentication server 20, it is difficult to grasp the mechanism for the transformation based only on the first salt, thereby further enhancing security in communication. Further, the first salt and the second salt are generated based on a salt request destined for the salt server 10 from the user PC 30. Thus, even when a third party acquires the first salt and the second salt in some way, the first salt and the second salt are highly likely to be invalid at that time point, thereby being able to prevent fraud by the third party.

Further, the user PC 30 transmits, to the authentication server 20, the first salt and the transformed TUID transformed based on the second salt. The authentication server 20 acquires the second salt based on the first salt, and acquires the TUID by inversely transforming the transformed TUID based on the acquired second salt. This enhances security in communication through use of a pair of two salts. The second salt is used as both transformation information and inverse transformation information, thereby being able to ensure security based on less salts. Thus, it is possible to simplify processing for enhancing security in communication and to reduce a processing load on the entire communication system S.

Further, the salt server 10 generates the first salt and the second salt based on a salt request received from the user PC 30. The salt server 10 transmits the second salt to the authentication server 20 based on the salt request received from the authentication server 20. Thus, the authentication server 20 is not required to manage the first salt and the second salt, to thereby be able to distribute processing loads in communication. That is, the processing can be distributed between the salt server 10 and the authentication server 20. Accordingly, it is possible to reduce a processing load on the authentication server 20.

Further, the user PC 30 transmits a salt request that does not include information relating to the acquisition rule for the first salt and the second salt to the salt server 10. Thus, even when a malicious third party steals the salt request, it is difficult to decipher a mechanism for the transformation of a TUID. For example, even when the first salt and the second salt corresponding to a time stamp have been acquired, the acquisition rule cannot be grasped based only on the salt request, thereby further enhancing security in communication.

Further, the salt server 10 deletes a plurality of salts when a predetermined deletion time point is reached after the plurality of salts are generated. Thus, the salts that are no longer required are deleted from the salt database DB1, and it is possible to reliably prevent the salts from leaking out, thereby further enhancing security in communication. It is also possible to suppress a memory consumption amount of the salt database DB1.

Further, the salt server 10 deletes a plurality of salts based on a request received from the authentication server 20. Thus, the salts that are no longer required are deleted from the salt database DB1, and it is possible to reliably prevent the salts from leaking out, thereby further enhancing security in communication. It is also possible to suppress the memory consumption amount of the salt database DB1.

Further, the authentication server 20 acquires the TUID by inversely transforming the transformed TUID, executes authentication processing relating to the user based on the acquired TUID, and generates a new TUID when the authentication processing is successful. This enhances security at a time of authentication. For example, the TUID is changed each time the user logs in, and hence even when a third party performs the above-mentioned cross-site scripting attack or the like, authentication cannot be successful, thereby being able to prevent impersonation.

2. Second Embodiment

In the first embodiment, the case in which security in communication is enhanced by devising the method of acquiring the salt has been described. A method of enhancing security in communication is not limited to the example of the first embodiment. In the second embodiment, security in communication is enhanced by selectively using the transform function "f" in accordance with the first salt. In the following second embodiment and third embodiment, description of the same points as in the first embodiment is omitted.

Figure 8:
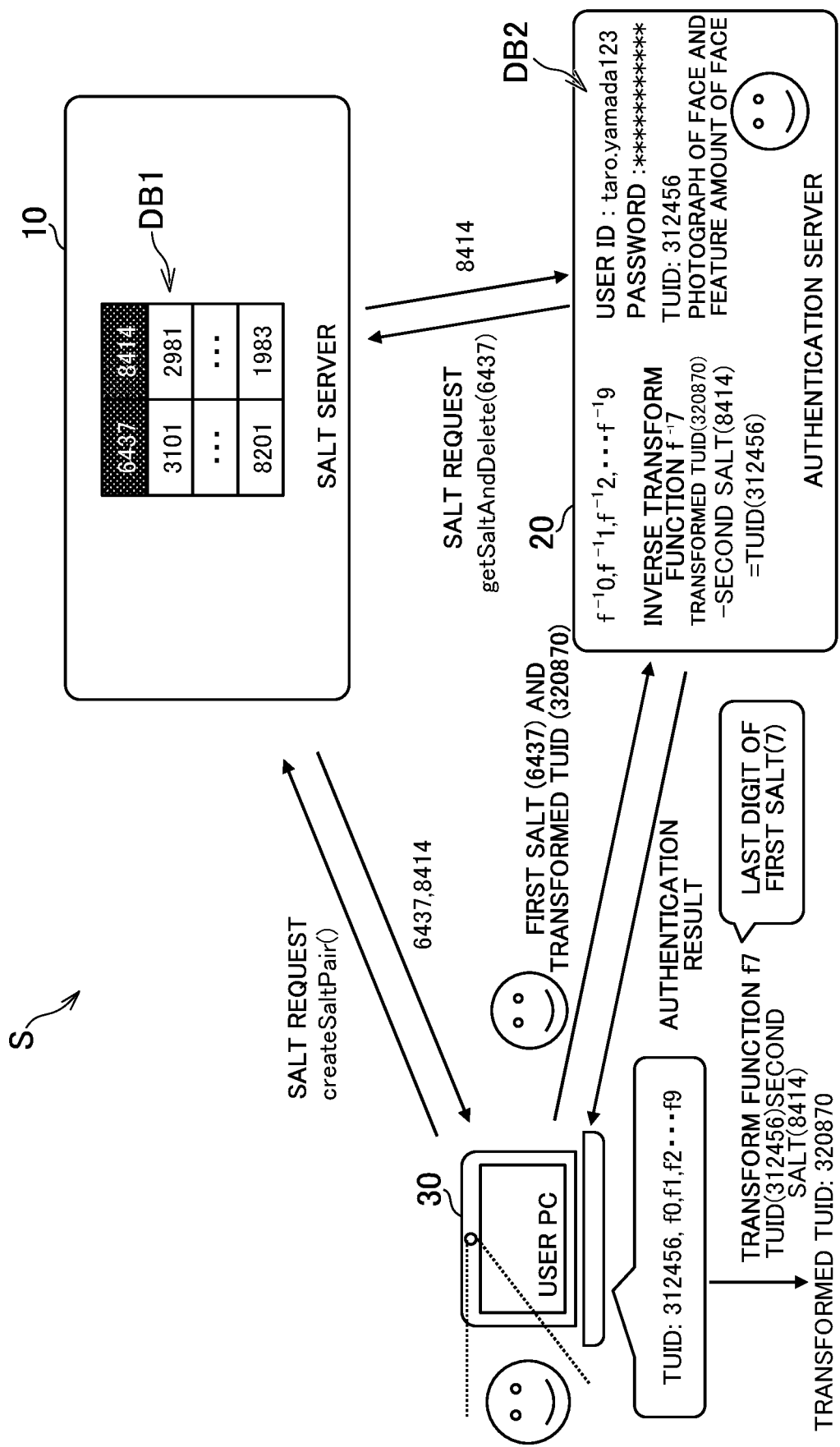
FIG. 8 is a diagram for illustrating an example of a flow of multi-factor authentication in a second embodiment of the present disclosure.

FIG. 8 is a diagram for illustrating an example of a flow of multi-factor authentication in the second embodiment. In the second embodiment, a general flow may be the same as that of the first embodiment. In the example of FIG. 8, the method of acquiring the first salt and the second salt is the same as that of the first embodiment. The user PC 30 acquires the first salt "6437" and the second salt "8414" from the salt server 10 in the same manner as in the example of FIG. 2 for illustrating the first embodiment.

In the second embodiment, the user PC 30 selectively uses the transform function "f" based on the last digit of the first salt "6437". For example, the user PC 30 stores transform functions f0 to f9 corresponding to the last digits "0" to "9", respectively. The transform functions f0 to f9 are hereinafter referred to simply as "transform function f" unless distinguished. It is assumed that calculation methods indicated by the individual transform functions "f" are different from each other. Thus, even with the same salt being used, when the transform function "f" differs, the value of the transformed TUID differs as well.

In the example of FIG. 8, the transform function f7 corresponding to the last digit "7" of the first salt "6437" is selected. This transform function f7 is assumed to be the same as the transform function "f" described in the first embodiment with reference to FIG. 2. Processing to be performed by the user PC 30 after the transform function f7 is selected is the same as in the first embodiment. When the authentication server 20 receives the first salt "6437" and the transformed TUID "320870", the authentication server 20 acquires the first salt "6437" from the salt server 10 in the same manner as in the first embodiment.

In the second embodiment, the authentication server 20 selectively uses the inverse transform function $f^{-1}$ based on the last digit "7" of the first salt "6437". For example, the authentication server 20 stores inverse transform functions $f^{-1}0$ to $f^{-1}9$ corresponding to the last digits "0" to "9", respectively. The inverse transform functions $f^{-1}0$ to $f^{-1}9$ are hereinafter referred to simply as "inverse transform function $f^{-1}$" unless distinguished. The calculation methods indicated by the individual inverse transform functions $f^{-1}$ are different from each other. Thus, with the same second salt "8414" being used, when the inverse transform function $f^{-1}$ differs, the value of the inversely transformed TUID differs as well.

In the example of FIG. 8, the inverse transform function $f^{-1}7$ corresponding to the last digit "7" of the first salt "6437" is selected. This inverse transform function $f^{-1}7$ is assumed to be the same as the inverse transform function $f^{-1}$ described in the first embodiment with reference to FIG. 2. A flow of the multi-factor authentication including processing to be performed by the authentication server 20 after the inverse transform function $f^{-1}7$ is selected is the same as in the first embodiment.

Figure 9:
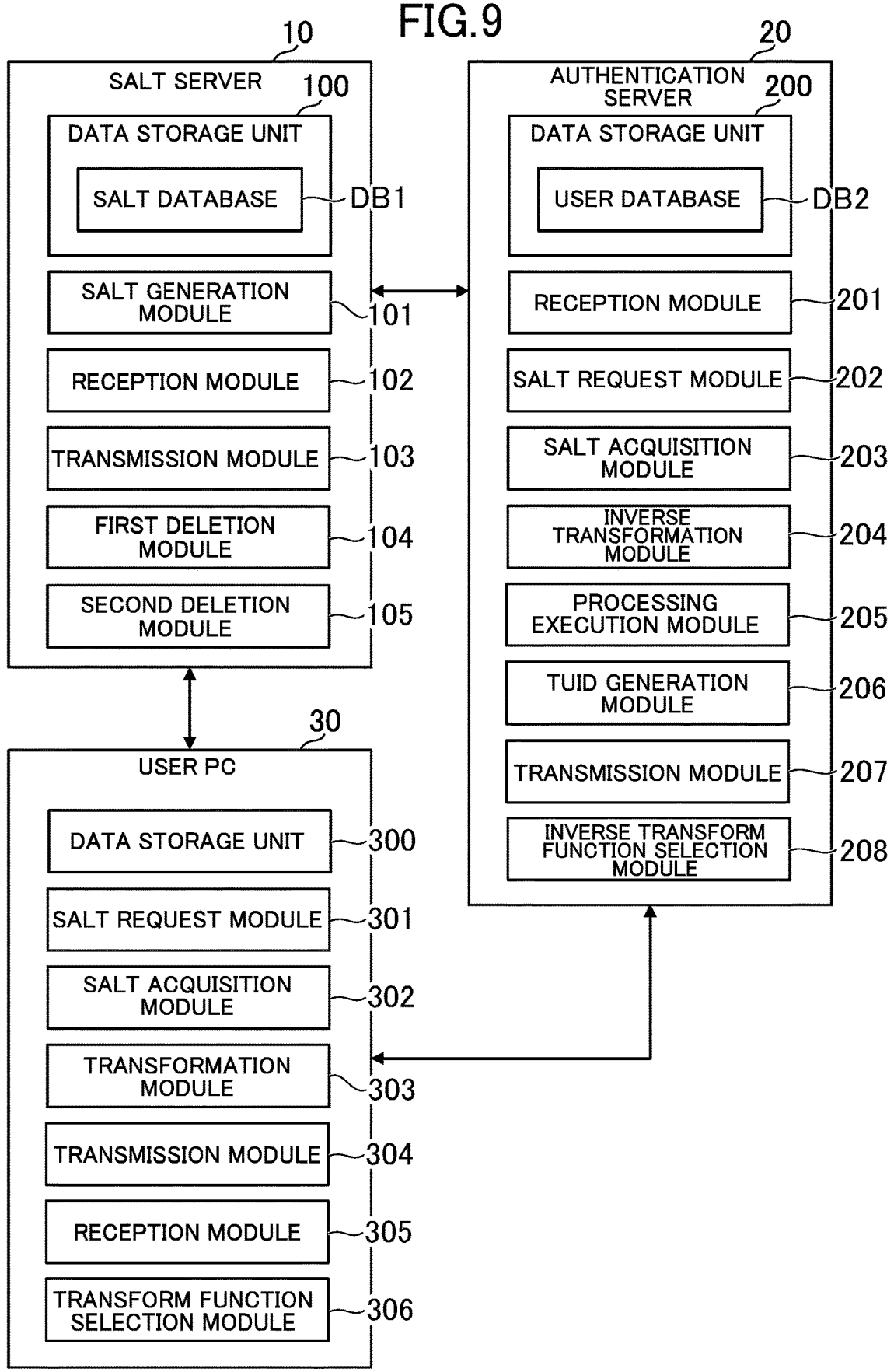
FIG. 9 is a diagram for illustrating an example of functional blocks implemented by the communication system according to the second embodiment.

FIG. 9 is a diagram for illustrating an example of functional blocks implemented by the communication system S according to the second embodiment. As illustrated in FIG. 9, in the second embodiment, an inverse transform function selection module 208 and a transform function selection module 306 are implemented. The inverse transform function selection module 208 is implemented mainly by the control unit 21. The transform function selection module 306 is implemented mainly by the control unit 31. In the second embodiment, the first salt is the identification information for acquiring the second salt, but is also information for selecting a transformation method and an inverse transformation method for a TUID.

The transform function selection module 306 selects any one of the plurality of transform functions "f" based on the first salt. The transform function "f" is an example of a transformation method. Accordingly, the transform function "f" as used herein can be read as "transformation method." The transformation method is a method of transforming the TUID. The transformation method is not limited to the transform function "f" as long as the transformation method defines how to transform the TUID. For example, the transformation method may be a calculation formula that is not called "function" or may be an encryption algorithm. In addition, for example, the transformation method may be a file compression algorithm.

The transform function selection module 306 is only required to select one of the plurality of transform functions "f" based on a predetermined selection method relating to the first salt. This selection method is a selection method for the transform function "f". This selection method is a method using the first salt as a condition. When a value of the first salt changes, the transform function "f" to be selected can also change. For example, the transform function selection module 306 selects any one of the plurality of transform functions "f" based on a part of the first salt. The transform function selection module 306 may select the transform function "f" based on the entire first salt.

In the second embodiment, a case of using a value of the last digit of the first salt as an example of the selection method is described. The transform function selection module 306 selects the transform function "f" corresponding to the last digit of the first salt. It is assumed that a relationship between the last digit of the first salt and the transform function "f" is defined in the data storage unit 300 in advance. The transform function selection module 306 selects the transform function "f" corresponding to the last digit of the first salt. In the second embodiment, the numerical values "0" to "9" that can be assumed by the last digit of the first salt correspond to numerical values included in the transform functions "f0" to "f9," respectively.

In the second embodiment, the transform function selection module 306 selects any one of the plurality of transform functions "f" based on the first salt without requesting another device to select the transform function "f". Another device is a device different from the user PC 30. For example, another device is the salt server 10, the authentication server 20, or another server computer. After the first salt is acquired, the transform function selection module 306 completes the selection of the transform function "f" through only the processing performed within the user PC 30. In the third embodiment described later, unlike in the second embodiment, the selection of the transform function "f" by another device takes place.

The transformation module 303 generates the transformed TUID based on the transform function "f" selected by the transform function selection module 306. The second embodiment differs from the first embodiment in that the transform function "f" selected by the transform function selection module 306 is used, but other points are the same.

The inverse transform function selection module 208 selects any one of a plurality of inverse transform functions $f^{-1}$ based on the first salt. The inverse transform function $f^{-1}$ is an example of an inverse transformation method. Accordingly, the inverse transform function $f^{-1}$ as used herein can be read as "inverse transformation method." The inverse transformation method is a method of inversely transforming the transformed TUID. The inverse transformation method is not limited to the inverse transform function $f^{-1}$ as long as the inverse transformation method defines how to inversely transform the transformed TUID. For example, the inverse transformation method may be a calculation formula that is not called "function" or may be a decryption algorithm. In addition, for example, the inverse transformation method may be a file decompression algorithm.

The inverse transform function selection module 208 selects any one of the plurality of inverse transform functions $f^{-1}$ based on a predetermined selection method relating to the first salt. This selection method is the selection method for the inverse transform function $f^{-1}$. This selection method is a method that uses the first salt as a condition. When the value of the first salt changes, the selected inverse transform function $f^{-1}$ may also change. For example, the inverse transform function selection module 208 selects any one of the plurality of inverse transform functions $f^{-1}$ based on the part of the first salt. The inverse transform function selection module 208 may select the inverse transform function $f^{-1}$ based on the entire first salt.

In the second embodiment, a case of using the last digit of the first salt as an example of the selection method for the inverse transform function $f^{-1}$ is described. The inverse transform function selection module 208 selects the inverse transform function $f^{-1}$ corresponding to the last digit of the first salt. It is assumed that a relationship between the last digit of the first salt and the inverse transform function $f^{-1}$ is defined in the data storage unit 200 in advance. The inverse transform function selection module 208 selects the inverse transform function $f^{-1}$ corresponding to the last digit of the first salt. For example, the inverse transform function selection module 208 selects the inverse transform function $f^{-1}$ corresponding to the last digit of the first salt as the inverse transform function $f^{-1}$ corresponding to the transform function "f" selected by the transform function selection module 306.

In the second embodiment, the inverse transform function selection module 208 selects any one of the plurality of inverse transform functions $f^{-1}$ based on the first salt without requesting another device to select the inverse transform function $f^{-1}$. After the first salt is acquired, the inverse transform function selection module 208 completes the selection of the inverse transform function $f^{-1}$ through only the processing performed within the authentication server 20. In the third embodiment described later, unlike in the second embodiment, the selection of the inverse transform function $f^{-1}$ by another device takes place.

The inverse transformation module 204 acquires the TUID based on the inverse transform function $f^{-1}$ selected by the inverse transform function selection module 208. The second embodiment differs from the first embodiment and the second embodiment in that the inverse transform function $f^{-1}$ selected by the inverse transform function selection module 208 is used, but other points are the same.

According to the communication system S of the second embodiment, the user PC 30 selects any one of the plurality of transform functions "f" based on the first salt. The authentication server 20 selects any one of the plurality of inverse transform functions $f^{-1}$ based on the first salt. Thus, the transform function "f" is dynamically changed, and hence it becomes difficult for a third party to grasp the mechanism for the transformation, thereby further enhancing security in communication. Even when a malicious third party steals the salt request, it is difficult to grasp the mechanism for the transformation based on the first salt, thereby further enhancing security in communication.

Further, the user PC 30 selects any one of the plurality of transform functions "f" based on the first salt without requesting another device to select the transform function "f". The authentication server 20 selects any one of the plurality of inverse transform functions $f^{-1}$ based on the first salt without requesting another device to select the inverse transform function $f^{-1}$. Thus, there is no request to be issued to another device in order to select the transform function "f" and the inverse transform function $f^{-1}$, thereby being able to simplify processing required at a time of communication. It is also possible to reduce a time period to be required for completion of the multi-factor authentication.

Further, the user PC 30 selects any one of the plurality of transform functions "f" based on the part of the first salt. The authentication server 20 selects any one of the plurality of inverse transform functions $f^{-1}$ based on the part of the first salt. Thus, the first salt is not only used for acquiring the second salt, but can also be used for selecting the transform function "f" and the inverse transform function $f^{-1}$, thereby enabling the first salt to be utilized more effectively. In order to select the transform function "f" and the inverse transform function $f^{-1}$, it is not required to newly provide information other than the first salt, and hence it is possible to simplify the method of selecting the transform function "f" and the inverse transform function $f^{-1}$.

3. Third Embodiment

In the second embodiment, the case in which the authentication server 20 and the user PC 30 select the inverse transform function $f^{-1}$ and the transform function "f", respectively, has been described, but the inverse transform function $f^{-1}$ and the transform function "f" may be selected by a third party server.

Figure 10:
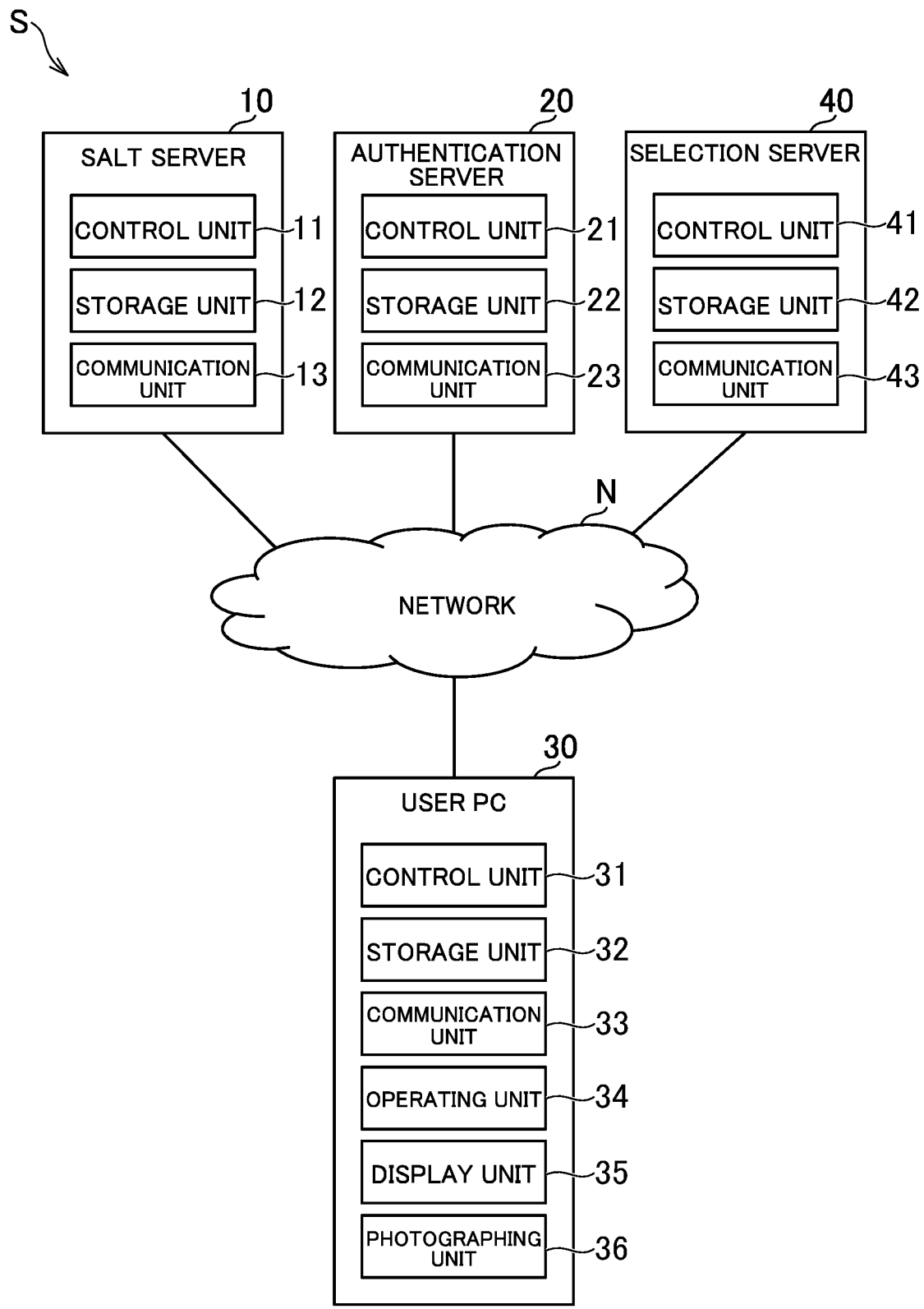
FIG. 10 is a diagram for illustrating an example of an overall configuration of an authentication system in a third embodiment of the present disclosure.

FIG. 10 is a diagram for illustrating an example of an overall configuration of the authentication system S according to the third embodiment. As illustrated in FIG. 10, the authentication system S according to the third embodiment includes a selection server 40. The selection server 40 is a server computer. Physical configurations of a control unit 41, a storage unit 42, and a communication unit 43 may be the same as those of the control unit 11, the storage unit 12, and the communication unit 13, respectively. The selection server 40 is an example of a selection device. Accordingly, the selection server 40 as used herein can be read as "selection device." The selection device is a device that selects the transform function "f" and the inverse transform function $f^{-1}$. The selection device may be any device, and is not limited to the selection server 40 or another server computer. For example, the selection device may be a personal computer, a tablet terminal, or a smartphone. In addition, for example, the selection device may be a game machine, a vending machine, a POS terminal, an ATM, or another device.

Figure 11:
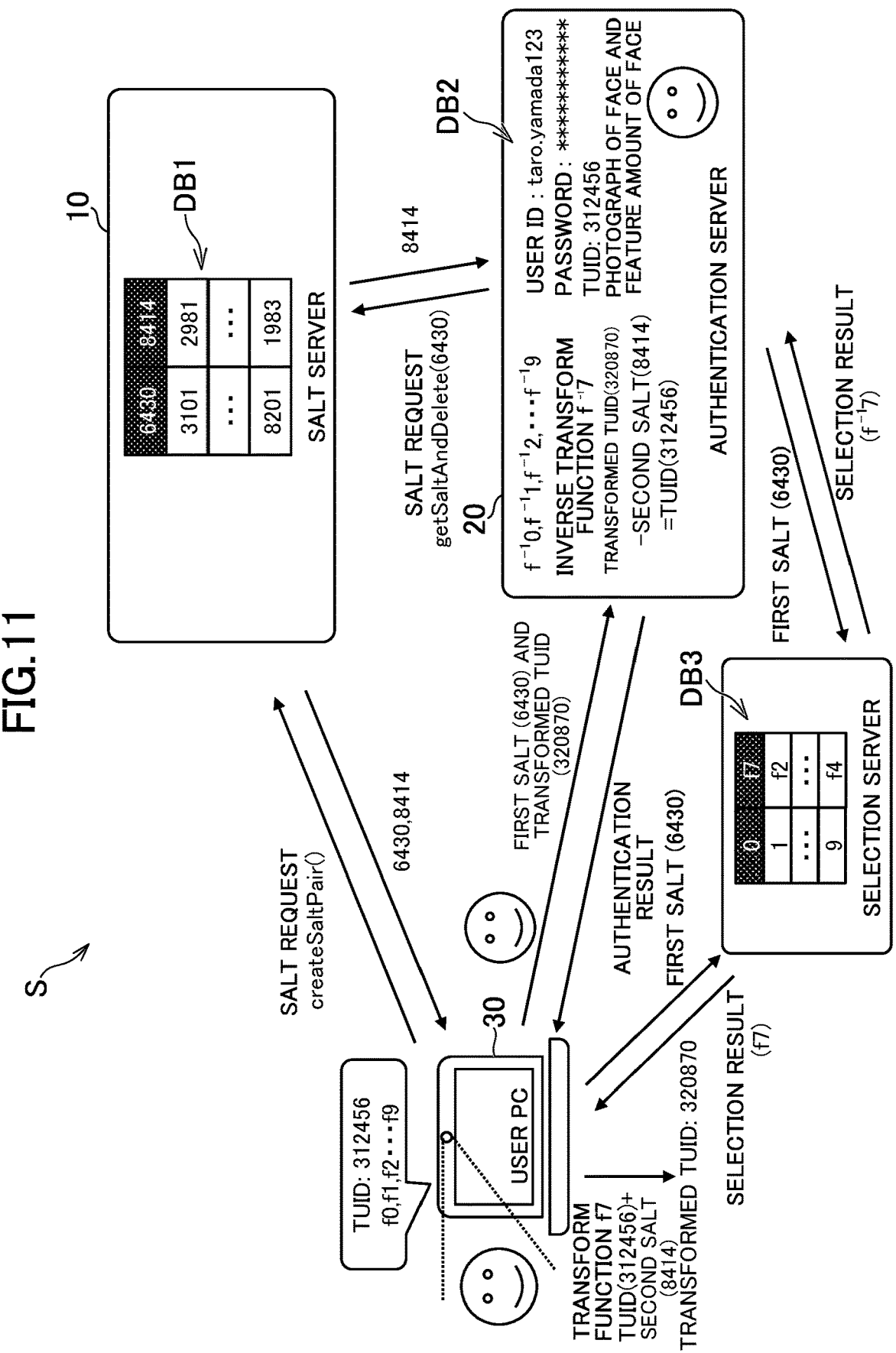
FIG. 11 is a diagram for illustrating an example of a flow of multi-factor authentication in the third embodiment.

FIG. 11 is a diagram for illustrating an example of a flow of multi-factor authentication in the third embodiment. In the third embodiment, a general flow may be the same as in the second embodiment. A flow to be performed until the user PC 30 acquires the first salt and the second salt is the same as in the second embodiment. In FIG. 11, "6430" is set as the first salt.

In the third embodiment, the user PC 30 transmits the first salt "6430" to the selection server 40. The selection server 40 stores a function database DB3. The function database DB3 is associated with the last digit of the first salt, the transform function "f", and the inverse transform function $f^{-1}$. In the example of FIG. 11, the inverse transform function "f" corresponds to the inverse transform function $f^{-1}$ to which the same numerical value as the suffix of the inverse transform function "f" is suffixed, and hence only the transform function "f" is shown in the function database DB3, but the function database may store both the transform function "f" and the inverse transform function $f^{-1}$. It is assumed that the association in the function database DB3 is updated at a predetermined timing. For example, the selection server 40 periodically updates the association in the function database DB3 at random.

The selection server 40 selects the transform function "f" based on the last digit "0" of the first salt "6430" received from the user PC 30. The selection server 40 is the one that selects the transform function "f", but the selection method itself for the transform function "f" may be the same as in the second embodiment. The selection server 40 transmits a selection result "f7" of the transform function "f" to the user PC 30. When the user PC 30 receives the selection result "f7" of the transform function "f", the user PC 30 transforms a TUID "312456". This transformation itself may be the same as in the second embodiment. The subsequent flow is the same as in the second embodiment until the authentication server 20 acquires the second salt "8414" from the salt server 10.

The authentication server 20 transmits the first salt "6430" to the selection server 40. The selection server 40 selects the inverse transform function $f^{-1}$ based on the last digit "0" of the first salt "6430" received from the authentication server 20. The selection server 40 is the one that selects the inverse transform function $f^{-1}$, but the selection method itself for the inverse transform function $f^{-1}$ may be the same as in the second embodiment. The selection server 40 transmits a selection result "$f^{-1}7$" of the inverse transform function $f^{-1}$ to the authentication server 20. When the authentication server 20 receives the selection result of the inverse transform function $f^{-1}$, the authentication server 20 inversely transforms the transformed TUID "320870". This inverse transformation itself may be the same as in the second embodiment. The subsequent flow of the multi-factor authentication is the same as in the second embodiment.

Figure 12:
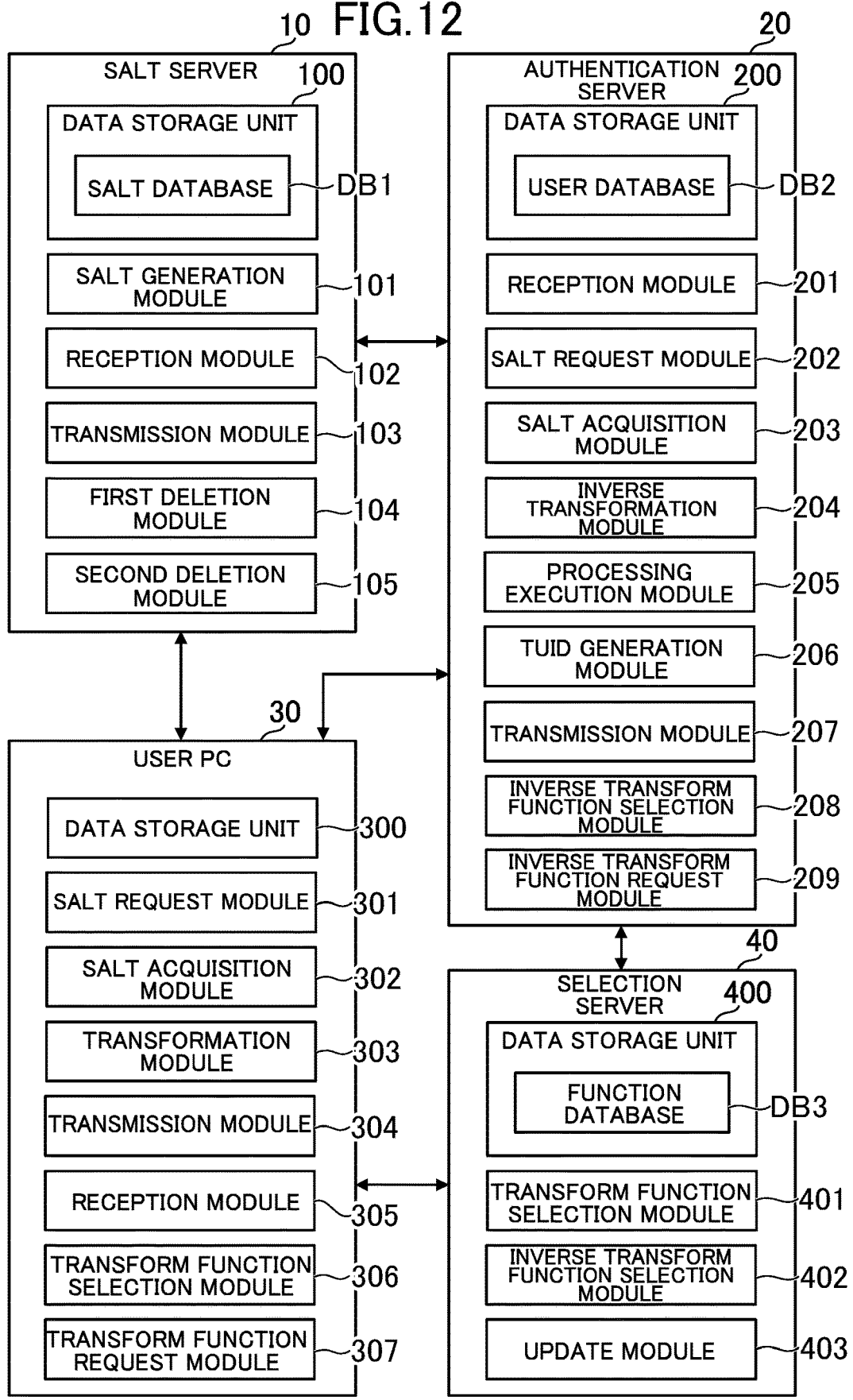
FIG. 12 is a diagram for illustrating an example of functional blocks implemented by the authentication system in the third embodiment.

FIG. 12 is a diagram for illustrating an example of functional blocks implemented by the authentication system S in the third embodiment. As illustrated in FIG. 12, in the third embodiment, an inverse transform function request module 209, a transform function request module 307, a data storage unit 400, a transform function selection module 401, an inverse transform function selection module 402, and an update module 403 are implemented. The inverse transform function request module 209 is implemented mainly by the control unit 21. The transform function request module 307 is implemented mainly by the control unit 31. The data storage unit 400 is implemented mainly by the storage unit 42. The transform function selection module 401, the inverse transform function selection module 402, and the update module 403 are implemented mainly by the control unit 41.

The transform function request module 307 requests the selection server 40 to select the transform function "f" based on the first salt. This request is hereinafter referred to as "transform function selection request." The transform function selection request may be issued in a predetermined format. The transform function selection request may include information that serves as a reference for the selection server 40 to select the transform function "f", or may include only a command to select the transform function "f". In the third embodiment, a case in which the transform function selection request includes the first salt is described, but the transform function selection request may include only the last digit of the first salt.

The inverse transform function request module 209 requests the selection server 40 to select the inverse transform function $f^{-1}$ based on the first salt. This request is hereinafter referred to as "inverse transform function selection request." The inverse transform function selection request may be issued in a predetermined format. The inverse transform function selection request may include information that serves as a reference for the selection server 40 to select the inverse transform function $f^{-1}$, or may include only a command to select the inverse transform function $f^{-1}$. In the third embodiment, a case in which the inverse transform function selection request includes the first salt is described, but the inverse transform function selection request may include only the last digit of the first salt.

The transform function selection module 401 selects any one of the plurality of transform functions "f" based on the transform function selection request received from the user PC 30. In the third embodiment, in the same manner as in the second embodiment, the case in which this selection method involves use of the value of the last digit of the first salt is described, but the selection method may be any other method. For example, the selection method may involve use of the value of the first digit of the first salt or the value of the second salt. The transform function selection module 401 transmits, as the selection result, information that can identify the transform function "f" selected by the selection server 40.

The inverse transform function selection module 402 selects any one of the plurality of inverse transform function $f^{-1}$ based on the inverse transform function selection request received from the authentication sever 20. In the third embodiment, in the same manner as in the second embodiment, the case in which this selection method involves use of the value of the last digit of the first salt is described, but the selection method may be any other method. For example, the selection method may involve use of the value of the first digit of the first salt or the value of the second salt. The inverse transform function selection module 402 transmits, as the selection result, information that can identify the inverse transform function $f^{-1}$ selected by the selection server 40.

The transform function selection module 306 selects the transform function "f" based on the selection result obtained by the selection server 40. The third embodiment differs from the first embodiment and the second embodiment in that the transform function "f" selected by the selection server 40 is used, but other points are the same.

The inverse transform function selection module 208 selects the inverse transform function $f^{-1}$ based on the selection result obtained by the selection server 40. The third embodiment differs from the first embodiment and the second embodiment in that the inverse transform function $f^{-1}$ selected by the selection server 40 is used, but other points are the same.

The update module 403 updates the association between the selection condition relating to the first salt and each of the plurality of transform functions "f" and the plurality of inverse transform functions $f^{-1}$. In the third embodiment, the association between those is stored in the function database DB3, and hence the update module 403 updates the function database DB3. The update module 403 updates the association in the function database DB3 when a predetermined update condition is satisfied.

The update condition is a condition for updating the association in the function database DB3. The update condition may be any condition, for example, a temporal condition or a condition relating to the number of times that the transform function "f" and inverse transform function $f^{-1}$ have been selected. For example, a condition that a predetermined operation has been performed by an administrator may correspond to the update condition. In the third embodiment, a case in which the update condition is a temporal condition and the update module 403 updates the association when a predetermined update time point is reached is described. The update time point may be any time point, for example, may be a predetermined time of the day or may be a time point set in a week or a month.

The update module 403 may update the function database DB3 so that the association becomes different from the association before the update. For example, the update module 403 updates the association so that the combination of the value of the last digit of the first salt and each of the transform function "f" and the inverse transform function $f^{-1}$ is shuffled. The transform function selection module 401 selects, after the association is updated by the update module 403, the transform function "f" based on the association after the update. The inverse transform function selection module 402 selects, after the association is updated by the update module 403, the inverse transform function $f^{-1}$ based on the association after the update. This is different from the above-mentioned processing for selecting the transform function "f" and the inverse transform function $f^{-1}$ in that the association after the update is used, but other points are the same.

According to the authentication system S in the third embodiment, the selection server 40 selects the inverse transform function $f^{-1}$ and the transform function "f" based on requests from the authentication server 20 and the user PC 30. Thus, the authentication server 20 and the user PC 30 are no longer required to have an algorithm for selecting the inverse transform function $f^{-1}$ and the transform function "f", and hence it is possible to simplify a mechanism of the multi-factor authentication. Further, the inverse transform function $f^{-1}$ and the transform function "f" defined in the function database DB3 can be easily changed periodically, and hence it becomes difficult for a third party to guess the mechanism for the transformation, thereby enhancing security in communication.

Further, the selection server 40 updates the association between the selection condition relating to the first salt and each of the plurality of transform functions "f" and the plurality of inverse transform functions $f^{-1}$. This changes the selection method for the inverse transform function $f^{-1}$ and the transform function "f", and it becomes difficult for a third party to identify mechanisms for the inverse transformation and the transformation, thereby further enhancing security in communication.

4. Modification Examples

Note that, the present disclosure is not limited to the first embodiment to the third embodiment, which have been described above, and can be modified suitably without departing from the spirit of the present disclosure.

4-1. Modification Example 1

For example, in the example of FIG. 11 for illustrating the third embodiment, it is assumed that a time point at which the selection server 40 received the transform function selection request from the user PC 30 is immediately before the update time point for the function database DB3. In this case, assuming that a time point at which the selection server 40 received the inverse transform function selection request from the authentication server 20 is immediately after the update time point for the function database DB3, the transform function "f" used for the transformation of the TUID and the inverse transform function $f^{-1}$ used for the inverse transformation of the transformed TUID may fail to correspond to each other.

In view of this, in Modification Example 1, when the selection server 40 received the transform function selection request from the user PC 30 immediately before the update time point for the function database DB3, information relating to a selection time point at which the transform function "f" was selected may be transmitted to the authentication server 20. The transmission module 304 further transmits, to the authentication server 20, time point information relating to the selection time point at which the transform function "f" was selected. The time point information is information that can identify whether or not the transform function "f" was selected before the function database DB3 is updated. The time point information may be transmitted from the selection server 40 to the user PC 30, or may be generated by the user PC 30 when the user PC 30 grasps the update time point in advance.

When the inverse transform function selection module 402 receives a request from the authentication server 20 immediately after the association in the function database DB3 is updated, the inverse transform function selection module 402 selects a first inverse transform function $f^{-1}$ based on the association before the update, and selects a second inverse transform function $f^{-1}$ based on the association after the update. The phrase "immediately after" herein means that the temporal length is smaller than a threshold value. Thus, the fact that the temporal length between the update time point of the association in the function database DB3 and the selection time point at which the transform function "f" is selected in response to the request received from the authentication server 20 is smaller than the threshold value corresponds to the phrase "immediately after."

The inverse transform function selection module 402 determines whether or not a time point at which the inverse transform function selection request was received from the authentication server 20 is later than the update of the function database DB3. When it is determined that this time point is later than the update of the function database DB3, the inverse transform function selection module 402 selects the first inverse transform function $f^{-1}$ based on the association before the update and the second inverse transform function $f^{-1}$ based on the association after the update. It is assumed that the data storage unit 400 holds the function database DB3 before the update as well.

The inverse transform function selection module 208 selects any one of the first inverse transform function $f^{-1}$ or the second inverse transform function $f^{-1}$ based on the time point information. The inverse transform function selection module 208 selects the first inverse transform function $f^{-1}$ when the time point information indicates that the transform function "f" was selected before the function database DB3 is updated. The inverse transform function selection module 208 selects the second inverse transform function $f^{-1}$ when the time point information indicates that the transform function "f" was selected after the function database DB3 is updated.

According to Modification Example 1, when a request from the authentication server 20 is received immediately after the association in the function database DB3 is updated, the selection server 40 selects the first inverse transform function $f^{-1}$ based on the association before the update, and selects the second inverse transform function $f^{-1}$ based on the association after the update. The authentication server 20 selects any one of the first inverse transform function $f^{-1}$ or the second inverse transform function $f^{-1}$ based on the time point information. Thus, the inverse transformation can be executed accurately even when the transform function "f" is selected immediately before the update time point. This can save time and effort to perform a retry after failing in the multi-factor authentication, thereby enhancing the convenience of the user. The salt server 10, the authentication server 20, the user PC 30, and the selection server 40 do not execute unrequired processing as well, and hence processing loads thereon can be reduced.

4-2. Modification Example 2

For example, when the selection time point at which the transform function "f" was selected by the selection server 40 is not immediately before the update time point, such a problem as described in Modification Example 1 is considered not to occur. For this reason, the user PC 30 may avoid transmitting the time point information to the authentication server 20 when the selection time point at which the transform function "f" was selected is not immediately before the update time point, and may transmit the time point information to the authentication server 20 when the selection time point is immediately before the update time point. The phrase "immediately before" herein means that the temporal length is smaller than a threshold value. The fact that the temporal length from the selection time point to the update time point is smaller than the threshold value corresponds to the phrase "immediately before."

The user PC 30 may determine whether or not the selection time point is immediately before the update time point, but it is assumed herein that the selection server 40 may perform the above-mentioned determination. The selection server 40 is assumed to have grasped the next update time point in advance. The selection server 40 receives the transform function selection request from the user PC 30, and determines whether or not the temporal length from the selection time point of selecting the transform function "f" to the update time point is smaller than a threshold value. A result of this determination is notified to the user PC 30.

When the selection time point is not immediately before the update time point, the user PC 30 is not required to receive the time point information from the selection server 40 in the first place. Even when the user PC 30 receives the time point information from the selection server 40, the user PC 30 avoids transmitting the time point information to the authentication server 20 unless the selection time point is immediately before the update time point. It is assumed that the user PC 30 receives, from the selection server 40, a result of determining whether or not the selection time point is immediately before the update time point. When the selection time point is immediately before the update time point, the user PC transmits the time point information to the authentication server 20 in the same manner as in Modification Example 1.

The inverse transform function selection module 402 selects the first inverse transform function $f^{-1}$ without selecting the second inverse transform function $f^{-1}$ when the selection time point is not immediately before the update time point, and when the selection time point is immediately before the update time point, selects the first inverse transform function $f^{-1}$ and the second inverse transform function $f^{-1}$. It is assumed that the selection server 40 holds the result of determining whether or not the selection time point is immediately before the update time point. The result of this determination may be held in association with the first salt received from the user PC 30. When the selection time point is not immediately before the update time point, the inverse transform function selection module 402 performs only the processing for selecting the first inverse transform function $f^{-1}$. When the selection time point is immediately before the update time point, the inverse transform function selection module 402 selects the first inverse transform function $f^{-1}$ and the second inverse transform function $f^{-1}$ in the same manner as in Modification Example 1.

The inverse transform function selection module 208 selects the first inverse transform function $f^{-1}$ when the selection time point is not immediately before the update time point, and when the selection time point is immediately before the update time point, selects any one of the first inverse transform function $f^{-1}$ or the second inverse transform function $f^{-1}$. When the selection time point is not immediately before the update time point, only information indicating the first inverse transform function $f^{-1}$ is received from the selection server 40, and hence it suffices that the inverse transform function selection module 208 selects the first inverse transform function $f^{-1}$ as it is. When the selection time point is immediately before the update time point, it suffices that the inverse transform function selection module 208 selects any one of the first inverse transform function $f^{-1}$ or the second inverse transform function $f^{-1}$ in the same manner as in Modification Example 1.

According to Modification Example 2, the selection server 40 selects the first inverse transform function $f^{-1}$ without selecting the second inverse transform function $f^{-1}$ when the selection time point is not immediately before the update time point, and when the selection time point is immediately before the update time point, selects the first inverse transform function $f^{-1}$ and the second inverse transform function $f^{-1}$. It is thus possible to simplify the processing when such processing as described in Modification Example 1 is not required. As a result, the processing loads on the authentication server 20, the user PC 30, and the selection server 40 can be reduced.

4-3. Modification Example 3

For example, when the transform function "f" and the inverse transform function $f^{-1}$ are selected based on a part of the first salt as in the second embodiment and the third embodiment, the part may be changed dynamically. That is, in the examples of FIG. 8 and FIG. 11, the cases in which the transform function "f" and the inverse transform function $f^{-1}$ are selected based on the last digit of the first salt have been described, but the part may be changed dynamically so that the transform function "f" and the inverse transform function f⁻¹ are selected based on the first digit or second digit of the first salt.

The transform function selection module 306 may determine a part to be used for selecting the transform function "f" based on a predetermined determination method, and may select any one of a plurality of transformation methods based on the determined part. This determination method is a method of determining which part of the first salt is to be used for selecting the transform function "f" and the inverse transform function f⁻¹. It suffices that this determination method is a predetermined method, and the determination method may be a method of randomly selecting a predetermined digit of the first salt, or may be a method designated by the administrator.

In Modification Example 3, the transform function selection module 306 determines any one digit of the first salt as the part to be used for selecting the transform function "f" based on a predetermined determination method. A relationship between this one-digit value and the transform function "f" may be the same as in FIG. 8 and FIG. 11. The transform function selection module 306 selects the transform function "f" based on the one-digit value of the first salt determined based on the predetermined determination method. For example, when this one-digit value is "1", the transform function f1 is selected. When this one-digit value is "7", the transform function f7 is selected.

The inverse transform function selection module 208 of the authentication server 20 determines the part to be used for selecting the inverse transform function f⁻¹ based on a predetermined determination method, and selects any one of the plurality of inverse transform functions f⁻¹ based on the determined part. This determination method is the same as the determination method described above. The selection method for the inverse transform function f⁻¹ is also the same as the selection method for the transform function "f".

According to Modification Example 3, the part to be used for selecting the transform function "f" and the inverse transform function f⁻¹ is dynamically changed. Thus, it becomes difficult for a third party to identify a mechanism for the selection of the transform function "f" and the inverse transform function f⁻¹, thereby further enhancing security in communication.

4-4. Modification Example 4

For example, it is assumed that, before the login of the user, a malicious third party has performed a cross-site scripting attack or the like to steal, from within the user PC 30, the TUID, the transform function "f", the method of accessing the salt server 10 (for example, flow of acquiring a salt by transmitting a createSaltPair( ) command to a specific IP address), and the photograph of the face of the user. In this case, even when the TUID is updated each time the user logs in, the third party has obtained a series of steps for accessing the salt server 10 and the information required for authentication, and hence there is a fear in that impersonation may become possible.

In view of this, when the user registers information such as the photograph of the face in the authentication server 20 or logs in through use of a user ID, a password, and the like in a secure manner, the user PC 30 may generate a hash value which is based on a plurality of pieces of information relating to the own device and transmit the hash value to the authentication server 20. This hash value is associated with the user ID and stored in the user database DB2. When the user executes authentication using the TUID to log in, the user PC 30 transforms the TUID and transmits, to the authentication server 20, the transformed TUID and the hash value which is based on the plurality of pieces of information relating to the user PC 30. As described in the first embodiment and the like, the transmission module 304 transmits the photograph of the face of the user as well.

The authentication server 20 acquires the transformed TUID by inversely transforming the TUID and executes the authentication processing based on the acquired TUID and the hash value. In the communication system S described in the first embodiment and the like, not only TUID authentication but also face authentication is used in combination, and hence the authentication server 20 executes the authentication processing based on the TUID, the feature amount of the face, and the hash value. Thus, the authentication processing in Modification Example 4 is three-factor authentication. The authentication using the TUID and the feature amount of the face is as described in the first embodiment and the like. The authentication server 20 determines whether or not the hash value received from the user PC 30 and the hash value stored in the user database DB2 in association with the user ID of the user match each other. When those match each other, the authentication using the hash value is successful.

Any pieces of information can be combined as the plurality of pieces of information for generating a hash value. For example, the user PC 30 may generate a hash value based on a plurality of pieces of information such as the type of the user PC 30, the type of an operating system, and the type of a browser. In addition, for example, the hash value may be generated based on other information such as a serial number of the user PC 30, a number of a SIM card, or a MAC address of a network card. Various hash functions can be used as the hash function itself for generating a hash value. It is assumed that the hash value is generated for each authentication instead of being stored in the user PC 30.

According to the communication system S of Modification Example 4, security is enhanced by authentication using a hash value. For example, even when a malicious third party fraudulently obtains the TUID and the like from within the user PC 30, it is highly possible that the hash value cannot be identified, and hence security is enhanced.

4-5. Modification Example 5

For example, the communication system S can be applied to another situation different from the situation in which the authentication processing is executed. As another situation, the communication system S can also be applied to another screen such as a situation in which an electronic mail is sent, a situation in which a file is uploaded or downloaded, a situation in which a post is made on social media, a situation in which a certain page is displayed on a browser, or a situation in which personal information is uploaded or downloaded by the user.

For example, when the communication system S is applied to the situation in which an electronic mail is sent, the first device is a computer on an electronic mail sending side, and the second device is a computer on an electronic mail receiving side. The original data is electronic mail data. The original data includes body text of an electronic mail. When an attached file is attached to the electronic mail, the original data includes the attached file. The first device subjects the original data, which is the electronic mail, to the transformation based on the second salt to generate the transformed data. The transformed data is the transformed electronic mail. The first device transmits the first salt and the transformed data, which is the transformed electronic mail, to the second device. When the second device receives the first salt and the transformed data, the second device acquires the second salt based on the first salt and performs the inverse transformation on the transformed data based on the acquired second salt to acquire the electronic mail, which is the original data. A method of acquiring the first salt is as described in the first embodiment to the third embodiment and Modification Example 1 to Modification Example 4.

For example, when the communication system S is applied to the situation in which a file is uploaded, the first device is a computer of the user that uploads the file, and the second device is a server that receives the file. The original data is a file to be uploaded. The first device subjects the original data, which is the file to be uploaded, to the transformation based on the first salt to generate the transformed data. The transformed data is the transformed file. The first device transmits the first salt and the transformed data, which is the transformed file, to the second device. When the second device receives the transformed data, the second device acquires the second salt based on the first salt and performs the inverse transformation based on the acquired second salt to acquire the file, which is the original data. A method of acquiring the first salt and the second salt is as described in the first embodiment to the third embodiment and Modification Example 1 to Modification Example 4.

The same applies to a case of applying the communication system S to another situation, and the first device is only required to transform original data based on a plurality of salts and transmit the transformed data to the second device. The second device is only required to inversely transform the transformed data based on a plurality of salts to acquire the original data. According to the communication system S of Modification Example 5, security in communication is enhanced in various situations.

4-6. Other Modification Examples

For example, the first embodiment to the third embodiment may be combined. The above-mentioned modification examples may be combined.

For example, the functions described as being implemented by the salt server 10 may be implemented by the authentication server 20 or the user PC 30. In this case, the communication system S is not required to include the salt server 10. For example, when the communication system S includes a plurality of server computers, the functions may be shared among the plurality of server computers. Further, for example, the data described as being stored in the data storage units 100 and 200 may be stored by a computer other than the salt server 10 or the authentication server 20.

The invention claimed is:
1. A communication system, comprising:
a user computer;
an authentication server; and
a salt server;
wherein the salt server is configured to generate a plurality of pieces of information based on a request received from the user computer, wherein the plurality of pieces of information are a plurality of salts and the salt server stores a first salt of the plurality of salts in association with a second salt of the plurality of salts
wherein the plurality of salts are random values,
wherein the salt server is configured to send the first salt and the second salt to the user computer,
wherein the user computer is configured to transform original data based on the second salt and transmit the first salt and transformed data obtained as a result of the transformation to the authentication server,
wherein the authentication server is configured to request the second salt from the salt server, wherein the request includes the first salt;
wherein the salt server is configured to transmit the second salt, which is associated with the first salt, to the authentication server,
wherein the authentication server is configured to inversely transform the transformed data based on the plurality of pieces of information to acquire the original data;
wherein the communication system is configured to generate, as the plurality of pieces of information, the first salt and the second salt for performing transformation and inverse transformation,
wherein the user computer is configured to:
  acquire the first salt and the second salt;
  transform the original data based on the second salt to generate the transformed data;
  transmit the first salt and the transformed data to the authentication server, and
wherein the authentication server is configured to:
  receive, from the user computer, the first salt and the transformed data;
  acquire the second salt based on the first salt; and
  inversely transform the transformed data based on the second salt to acquire the original data;
wherein the first salt comprises information for selecting a transformation method and an inverse transformation method for the original data,
wherein the user computer is configured to select any one of a plurality of the transformation methods based on the first salt,
wherein the user computer is configured to generate the transformed data based on the transformation method selected by the user computer,
wherein the authentication server is configured to select any one of a plurality of the inverse transformation methods based on the first salt,
wherein the authentication server is configured to acquire the original data based on the inverse transformation method selected by the authentication server;
wherein the communication system further comprises a selection device,
wherein the user computer is configured to request the selection device to select the transformation method based on the first salt,
wherein the selection device is configured to select any one of the plurality of the transformation methods based on a request received from the user computer,
wherein the user computer is configured to select the transformation method based on a selection result obtained by the selection device,
wherein the authentication server is configured to request the selection device to select the inverse transformation method based on the first salt,
wherein the selection device is configured to select any one of the plurality of the inverse transformation methods based on a request received from the authentication server,
wherein the authentication server is configured to select the inverse transformation method based on a selection result obtained by the selection device; and wherein the selection device is separate from the user computer.

2. The communication system according to claim 1,
wherein the user computer is configured to select any one of the plurality of the transformation methods based on the first piece of information without requesting another device to select the transformation method, and
wherein the authentication server is configured to select any one of the plurality of the inverse transformation methods based on the first piece of information without requesting another device to select the inverse transformation method.

3. The communication system according to claim 1, wherein the selection device is configured to update association between a selection condition relating to the first piece of information and each of the plurality of the transformation methods and the plurality of the inverse transformation methods.

4. The communication system according to claim 3,
wherein the selection device is configured to update the association when a predetermined update time point is reached,
wherein the user computer is configured to further transmit, to the authentication server, time point information relating to a selection time point at which the transformation method is selected,
wherein the selection device is configured to select, when the request is received from the authentication server immediately after the association is updated, a first inverse transformation method based on the association before the update and select a second inverse transformation method based on the association after the update, and
wherein the authentication server is configured to select any one of the first inverse transformation method or the second inverse transformation method based on the time point information.

5. The communication system according to claim 4,
wherein the user computer is configured to avoid transmitting the time point information to the authentication server when the selection time point is not immediately before the predetermined update time point, and transmit the time point information to the authentication server when the selection time point is immediately before the predetermined update time point,
wherein the selection device is configured to select, when the selection time point is not immediately before the predetermined update time point, the first inverse transformation method without selecting the second inverse transformation method, and select, when the selection time point is immediately before the predetermined update time point, the first inverse transformation method and the second inverse transformation method, and
wherein the authentication server is configured to select, when the selection time point is not immediately before the predetermined update time point, the first inverse transformation method, and select, when the selection time point is immediately before the predetermined update time point, any one of the first inverse transformation method or the second inverse transformation method.

6. The communication system according to claim 1,
wherein the user computer is configured to select any one of the plurality of the transformation methods based on a part of the first piece of information, and
wherein the authentication server is configured to select any one of the plurality of the inverse transformation methods based on the part of the first piece of information.

7. The communication system according to claim 6,
wherein the user computer is configured to determine the part to be used for selecting the transformation method based on a predetermined determination method, and select any one of the plurality of the transformation methods based on the determined part, and
wherein the authentication server is configured to determine the part to be used for selecting the inverse transformation method based on a predetermined determination method, and select any one of the plurality of the inverse transformation methods based on the determined part.

8. The communication system according to claim 1, further comprising a management device,
wherein the management device is configured to manage the first piece of information and the second piece of information,
wherein the user computer is configured to request the management device for the first piece of information and the second piece of information,
wherein management device is configured to generate the first piece of information and the second piece of information based on a request received from the user computer,
wherein the authentication server is configured to request the management device for the second piece of information based on the first piece of information, and
wherein the management device is configured to transmit the second piece of information to the authentication server based on a request received from the authentication server.

9. The communication system according to claim 8, wherein the user computer is configured to transmit, to the management device, a request that excludes information relating to an acquisition rule for the first piece of information and the second piece of information.

10. The communication system according to claim 1, wherein the communication system is configured to delete the plurality of pieces of information when a predetermined deletion time point is reached after the plurality of pieces of information are generated.

11. The communication system according to claim 1, wherein the communication system is configured to delete the plurality of pieces of information based on a request received from the authentication server.

12. The communication system according to claim 1,
wherein the original data comprises authentication data relating to a user of the user computer,
wherein the user computer is configured to transform the authentication data and transmit transformed data obtained as a result of the transformation to the authentication server, and
wherein the authentication server is configured to inversely transform the transformed data to acquire the authentication data, and execute authentication processing relating to the user based on the acquired authentication data to generate new authentication data.

13. The communication system according to claim 1,
wherein the original data comprises authentication data relating to a user of the user computer,
wherein the user computer is configured to transform the authentication data and transmit, to the authentication server, transformed data obtained as a result of the transformation and a hash value which is based on a plurality of pieces of information relating to the user computer, and
wherein the authentication server is configured to inversely transform the transformed data to acquire the authentication data, and execute authentication processing relating to the user based on the acquired authentication data and the hash value.

14. The communication system according to claim 1,
wherein the authentication server performs a first authentication of a user of the user computer according to a first authentication method; and
wherein the authentication server performs a second authentication of the user based on the inversely transformed data.

15. The communication system according to claim 1, wherein the original data is a temporary user identification.

16. The communication system according to claim 1, wherein the user computer transmits an image of a face of a user of the user computer and the transformed original data to the authentication server.

17. The communication system according to claim 1, wherein the user computer comprises a control unit, a storage unit, a communication unit, an operating unit, a display unit, and a photographing unit.

18. The communication system according to claim 1, wherein the salt server is separate from the user computer.

19. A communication method, which is performed between a user computer an authentication server, a salt server, and a selection device, the communication method comprising:
   generating a plurality of pieces of information based on a request received from the user computer, wherein the plurality of pieces of information are a plurality of salts and the salt server stores a first salt of the plurality of salts in association with a second salt of the plurality of salts, wherein the plurality of salts are random values;
   sending the first salt and the second salt from the salt server to the user computer,
   transforming, by the user computer, original data based on the plurality of pieces of information and transmitting transformed data obtained as a result of the transformation to the authentication server;
   wherein the authentication server is configured to request the second salt from the salt server, wherein the request includes the first salt;
   wherein the salt server is configured to transmit the second salt, which is associated with the first salt, to the authentication server; and
   inversely transforming, by the authentication server, the transformed data based on the plurality of pieces of information to acquire the original data;
   generating, as the plurality of pieces of information, the first salt and the second salt for performing transformation and inverse transformation,
   wherein the user computer is configured to:
      acquire the first salt and the second salt;
      transform the original data based on the second salt to generate the transformed data;
      transmit the first salt and the transformed data to the authentication server, and
   wherein the authentication server is configured to:
      receive, from the user computer, the first salt and the transformed data;
      acquire the second salt based on the first salt; and
      inversely transform the transformed data based on the second salt to acquire the original data;
   wherein the first salt comprises information for selecting a transformation method and an inverse transformation method for the original data,
   wherein the user computer is configured to select any one of a plurality of the transformation methods based on the first salt,
   wherein the user computer is configured to generate the transformed data based on the transformation method selected by the user computer,
   wherein the authentication server is configured to select any one of a plurality of the inverse transformation methods based on the first salt,
   wherein the authentication server is configured to acquire the original data based on the inverse transformation method selected by the authentication server;
   wherein the user computer is configured to request the selection device to select the transformation method based on the first salt,
   wherein the selection device is configured to select any one of the plurality of the transformation methods based on a request received from the user computer,
   wherein the user computer is configured to select the transformation method based on a selection result obtained by the selection device,
   wherein the authentication server is configured to request the selection device to select the inverse transformation method based on the first salt,
   wherein the selection device is configured to select any one of the plurality of the inverse transformation methods based on a request received from the authentication server, and
   wherein the authentication server is configured to select the inverse transformation method based on a selection result obtained by the selection device; and
   wherein the selection device is separate from the user computer.

20. A non-transitory computer-readable information storage medium storing a program for causing a user computer communicable to/from an authentication server, a salt server, and a selection device, to transform original data based on a plurality of pieces of information generated based on a request received from the user computer and transmit transformed data obtained as a result of the transformation to the authentication server;
   wherein the program causes the salt server to:
   generate the plurality of pieces of information based on a request received from the user computer, wherein the plurality of pieces of information are a plurality of salts and the salt server stores a first salt of the plurality of salts in association with a second salt of the plurality of salts, wherein the plurality of salts are random values;
   transmit the first salt and the second salt to the user computer;
   transmit the second salt, which is associated with the first salt, to the authentication server;
   wherein the program causes the authentication server to:
   request the second salt from the salt server, wherein the request includes the first salt; and
   inversely transform the transformed data based on the plurality of pieces of information to acquire the original data;
   generate, as the plurality of pieces of information, the first salt and the second salt for performing transformation and inverse transformation, wherein the program causes the user computer to:
    acquire the first salt and the second salt;
    transform the original data based on the second salt to generate the transformed data;
    transmit the first salt and the transformed data to the authentication server, and
wherein the program causes the authentication server to:
    receive, from the user computer, the first salt and the transformed data;
    acquire the second salt based on the first salt; and
    inversely transform the transformed data based on the second salt to acquire the original data;
wherein the first salt comprises information for selecting a transformation method and an inverse transformation method for the original data,
wherein the program causes the user computer to select any one of a plurality of the transformation methods based on the first salt,
wherein the program causes the user computer to generate the transformed data based on the transformation method selected by the user computer,
wherein the program causes the authentication server to select any one of a plurality of the inverse transformation methods based on the first salt,
wherein the program causes the authentication server to acquire the original data based on the inverse transformation method selected by the authentication server;
wherein the program causes the user computer to request the selection device to select the transformation method based on the first salt,
wherein the program causes the selection device to select any one of the plurality of the transformation methods based on a request received from the user computer,
wherein the program causes the user computer to select the transformation method based on a selection result obtained by the selection device,
wherein the program causes the authentication server to request the selection device to select the inverse transformation method based on the first salt,
wherein the program causes the selection device to select any one of the plurality of the inverse transformation methods based on a request received from the authentication server, and
wherein the program causes the authentication server to select the inverse transformation method based on a selection result obtained by the selection device; and
wherein the selection device is separate from the user computer.

* * * * *